US012334653B2

(12) United States Patent
Jiang et al.

(10) Patent No.: US 12,334,653 B2
(45) Date of Patent: Jun. 17, 2025

(54) ANTENNA AND ELECTRONIC DEVICE

(71) Applicants: BOE TECHNOLOGY GROUP CO., LTD., Beijing (CN); Beijing BOE Sensor Technology Co., Ltd., Beijing (CN); Research Institute of Millimeter Wave and Terahertz Technology, Jiangsu (CN)

(72) Inventors: Zhihao Jiang, Beijing (CN); Xinyu Wu, Beijing (CN); Fengshuo Wan, Beijing (CN); Hongyuan Feng, Beijing (CN); Jing Xie, Beijing (CN); Wenjin Gao, Beijing (CN); Meng Wei, Beijing (CN); Longzhu Cai, Beijing (CN); Chuncheng Che, Beijing (CN); Wei Hong, Beijing (CN)

(73) Assignees: BOE TECHNOLOGY GROUP CO., LTD., Beijing (CN); Beijing BOE Sensor Technology Co., Ltd., Beijing (CN); Research Institute of Millimeter Wave and Terahertz Technology, Jiangsu (CN)

( * ) Notice: Subject to any disclaimer, the term of this patent is extended or adjusted under 35 U.S.C. 154(b) by 0 days.

(21) Appl. No.: 18/027,726

(22) PCT Filed: Apr. 29, 2022

(86) PCT No.: PCT/CN2022/090497

§ 371 (c)(1),
(2) Date: Mar. 22, 2023

(87) PCT Pub. No.: WO2023/206438

PCT Pub. Date: Nov. 2, 2023

(65) Prior Publication Data

US 2024/0304995 A1 Sep. 12, 2024

(51) Int. Cl.
*H01Q 3/36* (2006.01)
*H01P 1/18* (2006.01)
(Continued)

(52) U.S. Cl.
CPC ............ *H01Q 9/0414* (2013.01); *H01Q 1/22* (2013.01); *H01Q 1/48* (2013.01); *H01Q 3/36* (2013.01)

(58) Field of Classification Search
CPC ............. H01Q 1/22; H01Q 1/48; H01Q 3/36; H01Q 9/04; H01Q 9/0414; H01Q 1/38; H01Q 1/50; H01Q 21/06; H01Q 21/065
See application file for complete search history.

(56) References Cited

U.S. PATENT DOCUMENTS 11,424,520 B2 * 8/2022 Hu ........................ G02F 1/1343
11,545,750 B2 * 1/2023 Xi ........................... H01Q 3/36
(Continued)

FOREIGN PATENT DOCUMENTS

CN 104409855 A 3/2015
CN 106154603 A 11/2016
(Continued)

*Primary Examiner* — Tho G Phan
(74) *Attorney, Agent, or Firm* — HOUTTEMAN LAW LC

(57) ABSTRACT

An antenna and an electronic device are provided. The antenna includes a phase shifting unit, a reference electrode layer, and an antenna substrate; the phase shifting unit includes at least one phase shifter, each includes a first transmission structure, a second transmission structure, and a phase shifting structure therebetween; the reference electrode layer is provided with at least one and second first openings; the antenna substrate includes a first dielectric substrate, and a feed structure and at least one first radiation portion on a side of the first dielectric substrate away from the reference electrode layer; the feed structure includes at least one first and second feed ports; for each phase shifter,
(Continued)

the first transmission structure is electrically connected to a corresponding second feed port through a corresponding first opening; and the second transmission structure is electrically connected to a corresponding first radiation portion through a corresponding second opening.

19 Claims, 14 Drawing Sheets

(51) Int. Cl.
*H01Q 1/22* (2006.01)
*H01Q 1/48* (2006.01)
*H01Q 9/04* (2006.01)

(56) References Cited

U.S. PATENT DOCUMENTS 11,646,489 B2 * 5/2023 Wang ........................ H01Q 3/36
333/161
11,949,141 B2 * 4/2024 Fang ........................ H01P 1/184
12,126,065 B2 * 10/2024 Liu ........................ H01Q 3/36
2020/0343634 A1 10/2020 Wang et al.
2020/0381824 A1 12/2020 Kao et al.

FOREIGN PATENT DOCUMENTS

CN 106450765 A 2/2017
CN 107275805 A 10/2017
CN 109273842 A 1/2019
CN 110176673 A 8/2019
CN 110474151 A 11/2019
CN 111245529 A 6/2020
CN 111293425 A 6/2020
CN 210720940 U 6/2020
CN 112490645 A 3/2021
CN 113594686 A 11/2021
CN 113594690 A 11/2021
CN 114256571 A 3/2022
CN 114388996 A 4/2022
WO 2012080532 A1 6/2012

* cited by examiner

ANTENNA AND ELECTRONIC DEVICE

TECHNICAL FIELD

The present disclosure relates to the field of communication technology, and in particular to an antenna and an electronic device.

BACKGROUND

With the rapid development of the 5G technology, the demand for a low-cost large-scale phased array antenna becomes more and more prominent in the communication field. In a conventional large-scale antenna or phased-array antenna, the phases of elements of the phased-array antenna are usually controlled independently by means of a digital chip from the aspects of cost, volume, power consumption and the like, so that the beam scanning is realized. The precision of the digital chip for controlling the phases depends on a digitalizing bit of a digital to analog (DA) converter in the chip, the high-precision chip usually introduces a higher cost, and each chip has limited number of control channels, so that the number of chips and the circuit complexity are increased in multiples for the large-scale phased array antenna, thereby greatly improving the design time cost and the economic cost. In addition, factors, such as temperature drift, device aging and operating environment, affect the stability of the phase control of the digital chip to the phased array antenna, and even directly cause performance deterioration.

SUMMARY

The present disclosure is directed to at least one of the technical problems in the prior art, and provides an antenna and an electronic device.

In a first aspect, the technical scheme adopted for solving the technical problem of the present disclosure is an antenna, including: a phase shifting unit, a reference electrode layer, and an antenna substrate which are stacked; wherein the phase shifting unit includes at least one phase shifter, each phase shifter includes a first transmission structure, a second transmission structure, and a phase shifting structure between the first transmission structure and the second transmission structure: the reference electrode layer is provided with at least one first opening and at least one second opening therein; the antenna substrate includes a first dielectric substrate, and a feed structure and at least one first radiation portion on a side of the first dielectric substrate away from the reference electrode layer: the feed structure includes a first feed port and at least one second feed port; and for each phase shifter, the first transmission structure is electrically connected to a corresponding second feed port through a corresponding first opening; and the second transmission structure is electrically connected to a corresponding first radiation portion through a corresponding second opening.

In some examples, the phase shifting structure includes a first substrate and a second substrate opposite to each other, and a tunable dielectric layer between the first substrate and the second substrate; wherein the first substrate includes a second dielectric substrate and a first transmission line and a second transmission line on a side of the second dielectric substrate close to the tunable dielectric layer; and the second substrate includes a third dielectric substrate and a plurality of patch electrodes on a side of the third dielectric substrate close to the tunable dielectric layer, the plurality of patch electrodes are arranged side by side in an extending direction of the first transmission line, and orthographic projections of the plurality of patch electrodes on the second dielectric substrate overlap with orthographic projections of the first transmission line and the second transmission line on the second dielectric substrate.

In some examples, each of the first transmission structure and the second transmission structure includes a main line, a first branch, and a second branch; and the first branch and the second branch of the first transmission structure have a one-piece structure, the first branch and the second branch of the second transmission structure have a one-piece structure, and each first branch and each second branch adopt a meandering line: the main line of the first transmission structure is coupled to a corresponding second feed port through a corresponding first opening: the first branch of the first transmission structure is electrically connected to one end of the first transmission line; and the second branch of the first transmission structure is electrically connected to one end of the second transmission line; and the main line of the second transmission structure is coupled to a corresponding first radiation portion through a corresponding second opening: the first branch of the second transmission structure is electrically connected to the other end of the first transmission line; and the second branch of the second transmission structure is electrically connected to the other end of the second transmission line.

In some examples, the antenna substrate further includes a fourth dielectric substrate on a side of the first dielectric substrate away from the reference electrode layer, and at least one second radiation portion on a side of the fourth dielectric substrate away from the first dielectric substrate; and orthographic projections of the second radiation portion and the first radiation portion corresponding to each other on the first dielectric substrate overlap with each other.

In some examples, the feed structure includes first feed lines of n stages; and each first feed line at the (m−1)th stage is connected to two first feed lines at the m-th stage: where $n \geq 2$, $2 \leq m \leq n$, and both m and n are integers.

In some examples, the antenna further includes a connector electrically connected to the first feed line at the first stage through the first feed port.

In some examples, each first radiation portion and each second radiation portion include a polygon, and any interior angle of the polygon is greater than or equal to 90°.

In some examples, the polygon includes a first side, a second side, a third side, a fourth side, a fifth side and a sixth side which are connected in sequence: an extending direction of the first side is the same as that of the fourth side, and is perpendicular to that of the second side and that of the fifth side: extending directions of the third side and the second side are the same, and an angle between each of the extending directions of the third side and the second side and the extending direction of the first side is in a range from 44.5° to 45.5°.

In some examples, the first side, the second side, the fourth side and the fifth side of each first radiation portion have the same length, which are all between 0.240 and 0.242 wavelength corresponding to an operating frequency of the antenna; and the third side and the sixth side of each first radiation portion have the same length, which are all between 0.073 and 0.074 wavelength corresponding to the operating frequency of the antenna; and lengths of the first side, the second side, the fourth side and the fifth side of each second radiation portion are all between 0.272 and 0.274 wavelength corresponding to the operating frequency of the antenna; and lengths of the third side and the sixth side of each second radiation portion are both between 0.092 and 0.094 wavelength corresponding to the operating frequency of the antenna.

In some examples, the antenna further includes a plurality of first metal isolation pillars penetrating through the antenna substrate; wherein an outline of an orthographic projection of the plurality of first metal isolation pillars on the first dielectric substrate surrounds the corresponding first radiation portion.

In some examples, a ratio of a radius of each first metal isolation pillar to a distance between any two adjacent first metal isolation pillars is between 0.25 and 0.5.

In some examples, the antenna further includes a plurality of second metal isolation pillars penetrating through the antenna substrate; wherein an outline of an orthographic projection of the plurality of second metal isolation pillars on the first dielectric substrate surrounds the corresponding phase shifter.

In some examples, a ratio of a radius of each second metal isolation pillar to a distance between any two adjacent second metal isolation pillars is between 0.25 and 0.5.

In some examples, a thickness of the tunable dielectric layer is between 4.4 μm and 4.8 μm.

In some examples, the antenna substrate further includes at least two second feed lines on a side of the first dielectric substrate away from the reference electrode layer; the at least two second feed lines are respectively at positions of the feed structure away from a center of the antenna substrate: the first substrate further includes third transmission lines on a side of the second dielectric substrate close to the tunable dielectric layer: each second feed line is electrically connected to the corresponding third transmission line through a corresponding first opening: the antenna substrate further includes at least two dummy units: each dummy unit includes a third radiation portion on a side of the first dielectric substrate away from the reference electrode layer: each third transmission line is electrically connected to the third radiation portion of the corresponding dummy unit through a corresponding second opening; and each dummy unit further includes a fourth radiation portion on a side of the fourth dielectric substrate away from the first dielectric substrate; and orthographic projections of the third radiation portion and the fourth radiation portion corresponding to each other on the first dielectric substrate overlap with each other.

In some examples, a first adhesive layer is between the first dielectric substrate and the fourth dielectric substrate, and the first adhesive layer is configured to adhere the first dielectric substrate and the fourth dielectric substrate together.

In some examples, a second adhesive layer is between the reference electrode layer and the first substrate, and the second adhesive layer is configured to adhere the reference electrode layer and the first substrate together.

In a second aspect, the present disclosure also provides an electronic device including the antenna of any one of the above embodiments in the first aspect, and a control unit: wherein the control unit configured to load a bias voltage to the at least one phase shifter in the antenna.

DETAIL DESCRIPTION OF EMBODIMENTS

In order to enable one of ordinary skill in the art to better understand the technical solutions of the present disclosure, the present invention will be described in further detail with reference to the accompanying drawings and the detailed description.

Unless defined otherwise, technical or scientific terms used herein shall have the ordinary meaning as understood by one of ordinary skill in the art to which the present disclosure belongs. The terms "first", "second", and the like used in the present disclosure are not intended to indicate any order, quantity, or importance, but rather are used for distinguishing one element from another. Further, the term "a", "an", "the", or the like used herein does not denote a limitation of quantity, but rather denotes the presence of at least one element. The term of "comprising", "including", or the like, means that the element or item preceding the term contains the element or item listed after the term and its equivalent, but does not exclude other elements or items. The term "connected", "coupled", or the like is not limited to physical or mechanical connections, but may include electrical connections, whether direct or indirect connections. The terms “upper”, “lower”, “left”, “right”, and the like are used only for indicating relative positional relationships, and when the absolute position of an object being described is changed, the relative positional relationships may also be changed accordingly.

Figure 1:
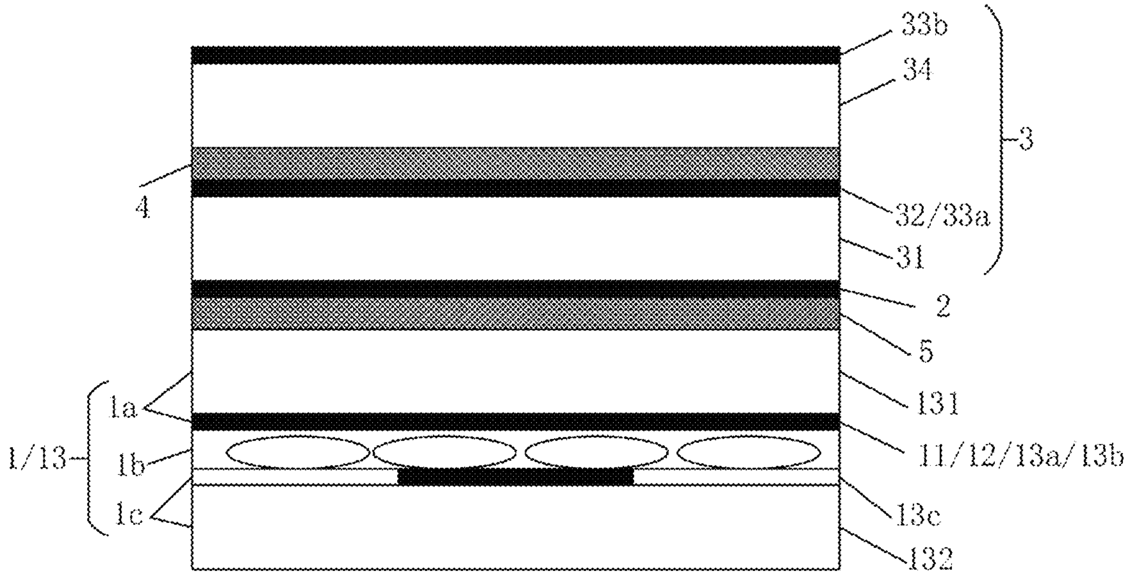
FIG. 1 is a cross-sectional view of an antenna according to an embodiment of the present disclosure.
Figure 2:
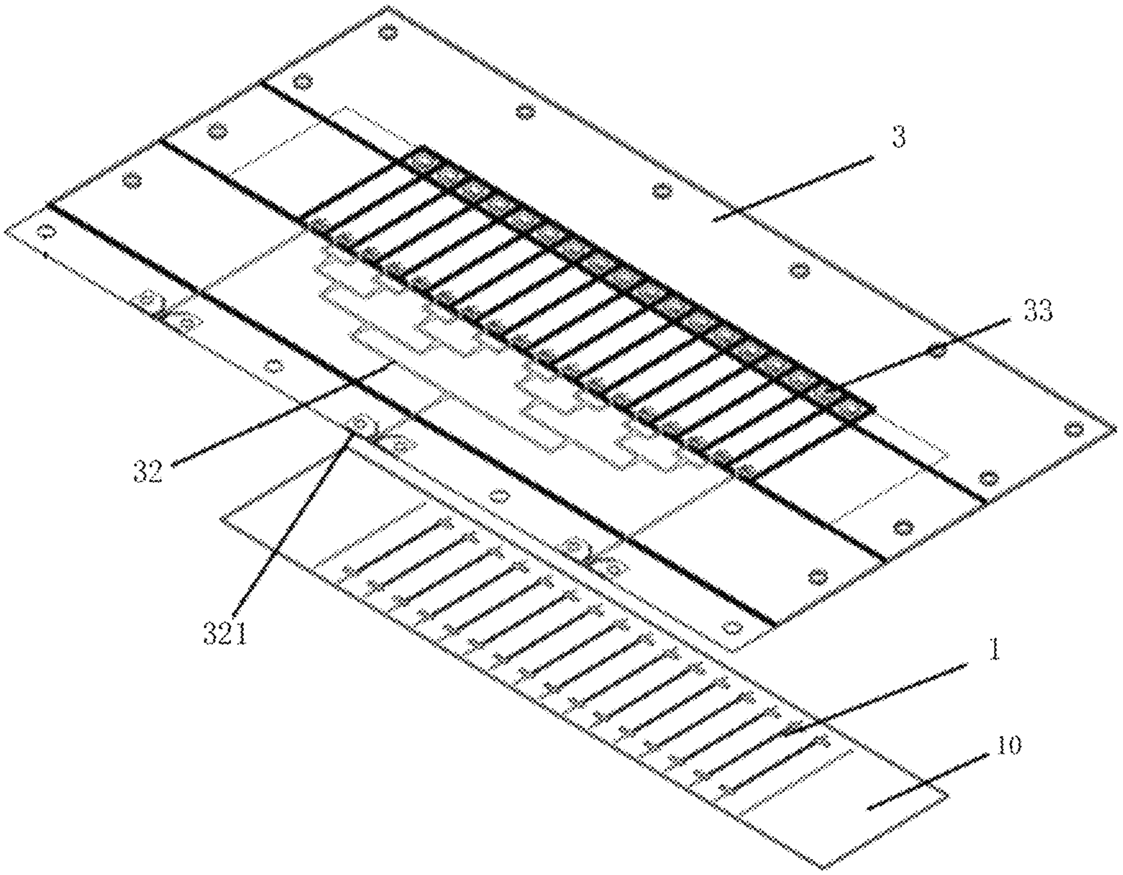
FIG. 2 is an assembly view of an antenna according to an embodiment of the present disclosure.
Figure 3:
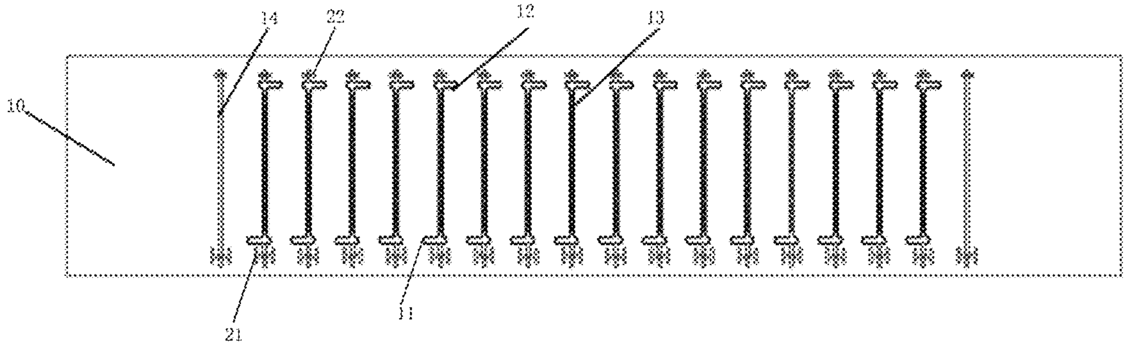
FIG. 3 is a top view of a phase shifting structure from a first perspective according to an embodiment of the present disclosure.
Figure 4:
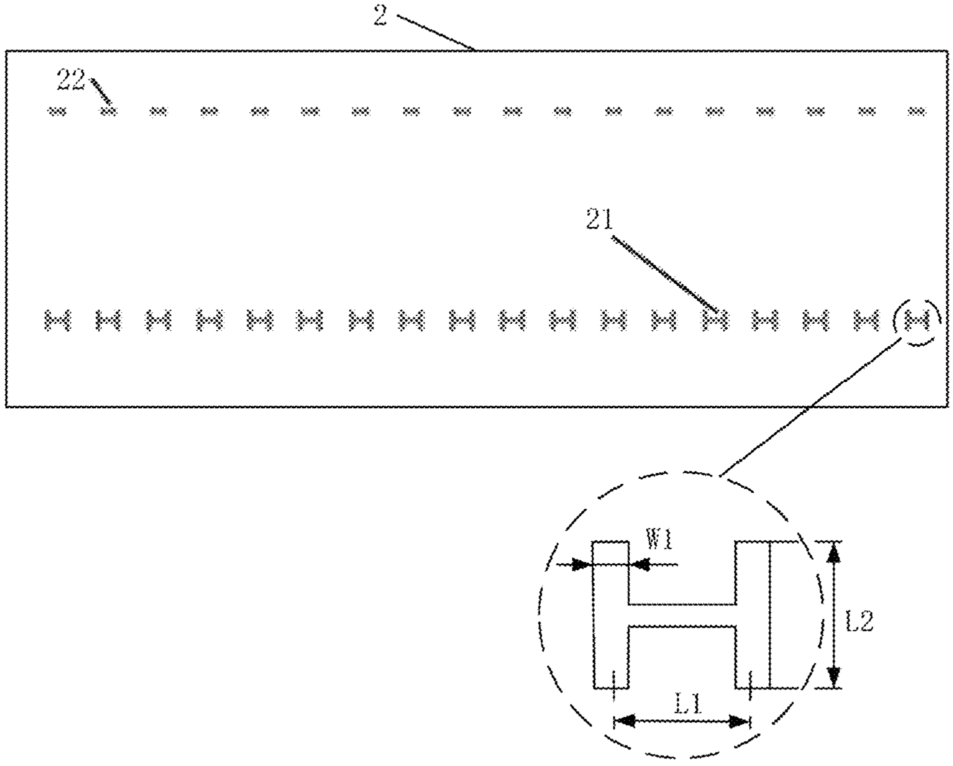
FIG. 4 is a top view of a reference electrode layer from a first perspective according to an embodiment of the present disclosure.
Figure 5:
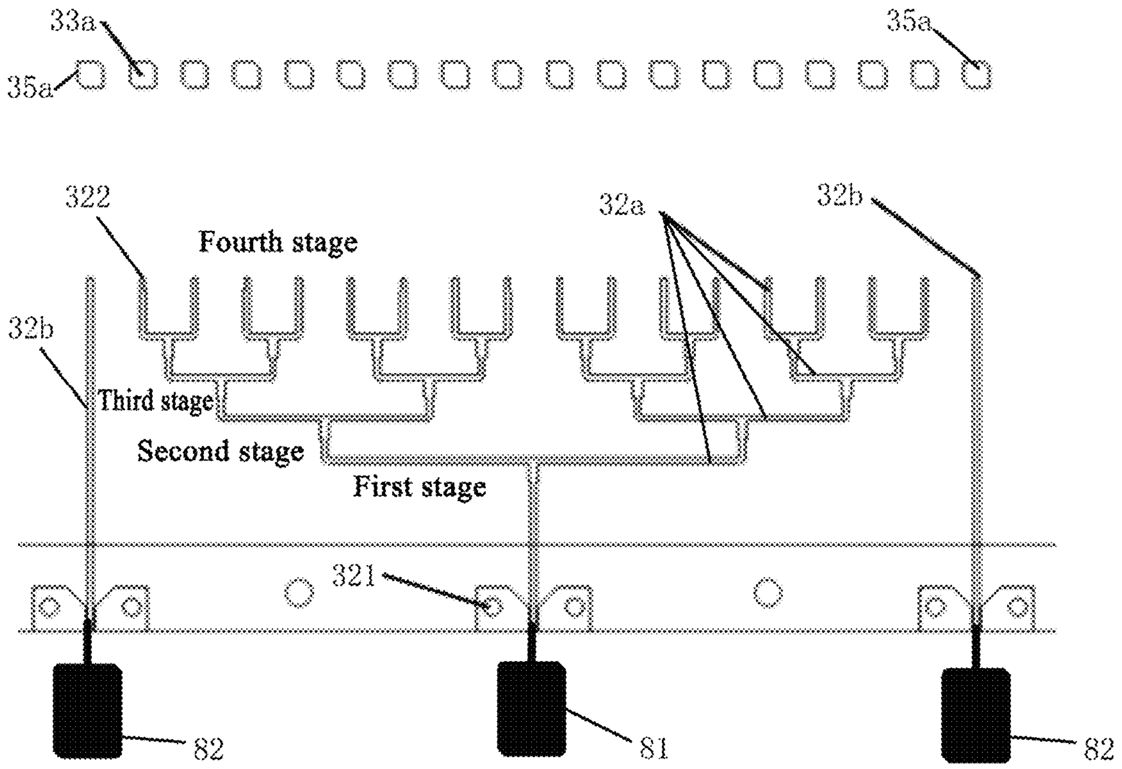
FIG. 5 is a top view of a first dielectric substrate in an antenna substrate from a first perspective according to an embodiment of the present disclosure.

In a first aspect, FIG. 1 is a cross-sectional view of an antenna according to an embodiment of the present disclosure: FIG. 2 is an assembly view of an antenna according to an embodiment of the present disclosure: FIG. 3 is a top view (front side) of a phase shifting structure from a first perspective according to an embodiment of the present disclosure: FIG. 4 is a top view (front side) of a reference electrode layer from a first perspective according to an embodiment of the present disclosure: FIG. 5 is a top view (front side) of a first dielectric substrate in an antenna substrate from a first perspective according to an embodiment of the present disclosure. With reference to FIGS. 1 to 5, an antenna provided in the embodiments of the present disclosure includes a phase shifting unit 10, a reference electrode layer 2, and an antenna substrate 3 which are stacked: where the reference electrode layer 2 is disposed between the phase shifting unit 1 and the antenna substrate 3. The phase shifting unit 10 includes at least one phase shifter 1, each including a first transmission structure 11, a second transmission structure 12, and a phase shifting structure 13 between the first transmission structure 11 and the second transmission structure 12. The reference electrode layer 2 is provided with at least one first opening 21 and at least one second opening 22 therein. The antenna substrate 3 includes a first dielectric substrate 31, and a feed structure 32 and at least one first radiation portion 33*a* arranged on a side of the first dielectric substrate 31 away from the reference electrode layer 2. The feed structure 32 includes a first feed port 321 and at least one second feed port 322.

In particular, for each phase shifter 1, the first transmission structure 11 is electrically connected to a corresponding second feed port 322 through a corresponding first opening 21: the second transmission structure 12 is electrically connected to a corresponding first radiation portion 33*a* through a corresponding second opening 22.

In some examples, the at least one first opening 21 may include, but be not limited to, an “H” shaped opening, which is composed of two types of rectangular slits orthogonal to each other. The at least one second opening 22 may include, but be not limited to, a rectangular slit. In the embodiment of the present disclosure, as an example, the at least one first opening 21 is the “H” shaped opening, and the at least one second opening 22 is the rectangular slit for description. As shown in FIG. 4, each first opening 21 may have a first side length L1 of 0.09λ, a second side length L2 of 0.053λ, and a width W1 of 0.025λ. Each second opening 22 may have a first side length L3 of 0.053λ, and a width W2 of 0.025λ.

It should be noted that in the embodiments of the present disclosure, λ is a wavelength at a center frequency.

For the feed structure 32, the first feed port 321 may be electrically connected to a connector 81 for transmitting radio frequency signals. Each second feed port 322 feeds the received radio frequency signal to the corresponding phase shifter 1 through the corresponding first opening 21. For example, the first and second feed ports 321 and 322 may be microstrip line structures.

In some examples, the phase shifting unit 10 may include a plurality of phase shifters 1 arranged in an array. According to the principle of the array synthesis, a shape of a radiation pattern of an antenna array is influenced by a distance between any two adjacent phase shifters 1 arranged in an array. If the distance between any two adjacent phase shifters 1 is too large, grating lobes appear when scanning at a large angle, so that the radiation energy is needlessly consumed, and the antenna gain is reduced. Therefore, in the embodiment of the present disclosure, the distance between any two adjacent ones of the plurality of phase shifters 1 arranged in an array in the phase shifting unit 10 may be set to be in a range from 0.4λ to 0.6λ corresponding to an operating frequency of the antenna. When forming the array, the distance for the array is preferably 0.5λ.

Figure 6:
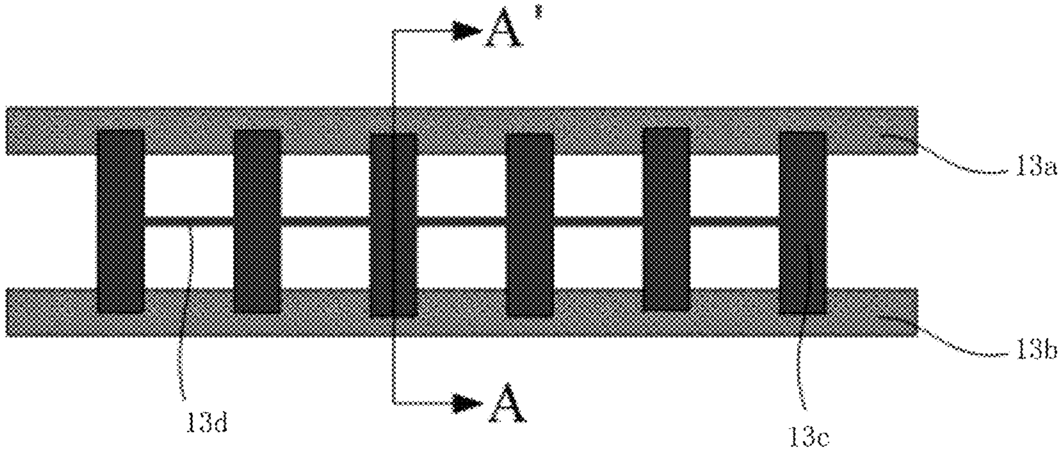
FIG. 6 is a schematic diagram of an exemplary phase shifting structure according to an embodiment of the present disclosure.
Figure 7:
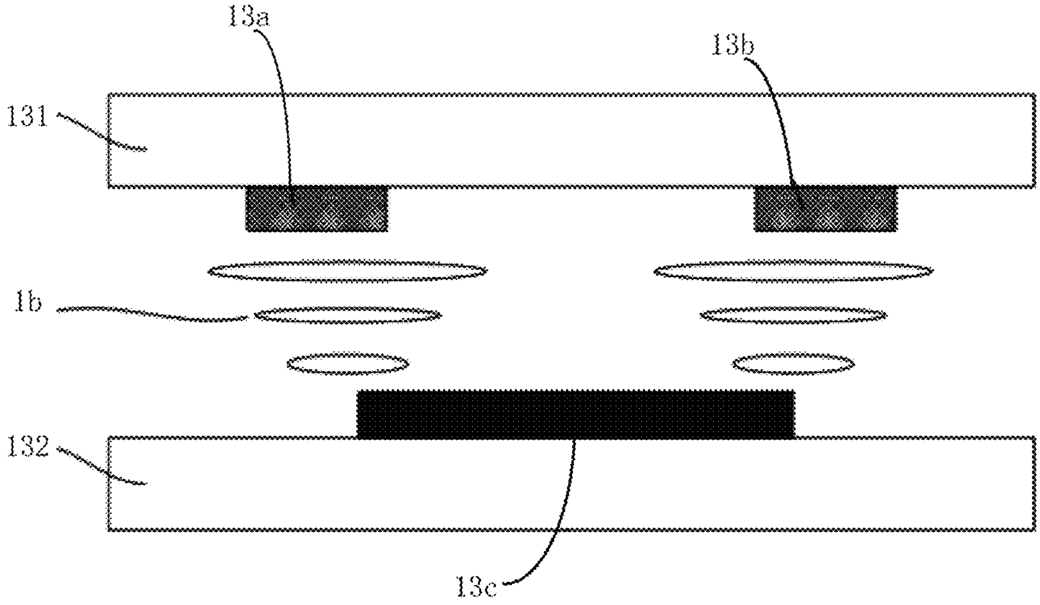
FIG. 7 is a cross-sectional view taken along a line A-A' of FIG. 6.

In some examples, FIG. 6 is a schematic diagram of an exemplary phase shifting structure according to an embodiment of the present disclosure; FIG. 7 is a cross-sectional view taken along a line A-A' of FIG. 6. As shown in FIGS. 6 and 7, the phase shifting structure 13 includes a first substrate 1*a* and a second substrate 1*c* disposed opposite to each other, and a tunable dielectric layer 1*b* sandwiched between the first substrate 1*a* and the second substrate 1*c*. In the embodiment of the present disclosure, the phase shifter 1 may include, but be not limited to, a liquid crystal phase shifter 1, and the tunable dielectric layer 1*b* may include, but be not limited to, a liquid crystal layer 1*c*. In the embodiment of the present disclosure, as an example, the tunable dielectric layer 1*b* is the liquid crystal layer 1*c* for description, that is, the phase shifter 1 is the liquid crystal phase shifter 1 for description as an example.

Specifically, the first substrate 1*a* includes a second dielectric substrate 131 and a first transmission line 13*a* and a second transmission line 13*b* disposed on a side of the second dielectric substrate 131 close to the tunable dielectric layer 1*b*. The second substrate 1*c* includes a third dielectric substrate 132 and a plurality of patch electrodes 13*c* disposed on a side of the third dielectric substrate 132 close to the tunable dielectric layer 1*b*, the plurality of patch electrodes 13*c* are arranged side by side in an extending direction of the first transmission line 13*a*, and orthographic projections of the plurality of patch electrodes 13*c* on the second dielectric substrate 131 overlap with orthographic projections of the first transmission line 13*a* and the second transmission line 13*b* on the second dielectric substrate 131. In this case, overlapping areas, where the orthographic projections of the plurality of patch electrodes 13*c* on the second dielectric substrate 131 overlap with the orthographic projections of the first transmission line 13*a* and the second transmission line 13*b* on the second dielectric substrate 131, are capacitance areas, respectively. By applying different bias voltages to the first transmission line 13*a*, the second transmission line 13*b* and the patch electrodes 13*c*, the dielectric constant of the liquid crystal molecules is changed in the overlapping area A where the orthographic projections of the plurality of patch electrodes 13*c* on the second dielectric substrate 131 overlap with the orthographic projection of the first transmission line 13*a* on the second dielectric substrate 131 and the overlapping area B where the orthographic projections of the plurality of patch electrodes 13*c* on the second dielectric substrate 131 overlap with the orthographic projection of the second transmission line 13*b* on the second dielectric substrate 131, so that the capacitances, are changed, formed in the overlapping area A where the orthographic projections of the plurality of patch electrodes 13*c* on the second dielectric substrate 131 overlap with the orthographic projection of the first transmission line 13*a* on the second dielectric substrate 131 and the overlapping area B where the orthographic projections of the plurality of patch electrodes 13*c* on the second dielectric substrate 131 overlap with the orthographic projection of the second transmission line 13*b* on the second dielectric substrate 131. After the received radio frequency signal is fed through the second feed port 322 into the corresponding phase shifter 1 through the corresponding first opening 21, the phase shifting structure 13 of the phase shifter 1 shifts the phase of the radio frequency signal.

The first transmission line 13*a* and the second transmission line 13*b* extend in the same direction and have the same length. With this arrangement, the miniaturization of the phase shifting structure 13 can be achieved, that is, the high integration of the antenna can be achieved.

For example, the first transmission line 13*a* and the second transmission line 13*b* may employ a micro-strip line structure.

In some examples, the patch electrodes 13*c* in the phase shifting structure 13 may be electrically connected together through a connection electrode 13*d*, and in this case, the patch electrodes 13*c* may be applied with the same bias voltage when the phase shifting structure 13 is operated, which is easy to control. An orthographic projection of the connection electrode 13*d* on the third dielectric substrate 132 does not overlap with orthographic projections of the first transmission line 13*a* and the second transmission line 13*b* on the third dielectric substrate 132.

In addition, widths of the patch electrodes 13*c* may be equal to each other or different from each other: lengths of the patch electrodes 13*c* may be equal to each other or different from each other. It should be noted that each patch electrode 13*c* may include, but be not limited to, a rectangular capacitive metal strip, and may also include a capacitive load with other shapes or structures, such as a capacitive metal strip having an "H" shape or a circular arc shape.

It should be noted that the reference electrode layer 2 illustrated in FIG. 1 includes, but is not limited to, a ground layer, as long as the reference electrode layer 2 forms a current loop with the first transmission line 13*a* and the patch electrodes 13*c*, and forms a current loop with the second transmission line 13*b* and the patch electrodes 13*c*.

In some examples, a thickness of the liquid crystal layer 1*c* may be between 4.4 μm and 4.8 μm. In particular, the thickness of the liquid crystal layer 1*c* may be selected to be 4.6 μm. Two parameters are used to characterize the liquid crystal material in the liquid crystal layer 1*c*, namely, a loss tangent tan δ and a relative dielectric constant ε. When a bias voltage (in a range from 0 to 23.5V) is applied to the liquid crystal material, a variation range of the relative dielectric constant ε is between 2.62 and 3.58, and a variation range of the tan δ is between 0.0038 and 0.0053. In this case, the phase shifting structure 13 can play a role of miniaturization. The liquid crystal layer 1*c* with the lower thickness is provided, which can reduce the response time of liquid crystals to the bias voltage, reduce the switching time for scanning of the beam of the antenna to a value much less than the entire response time of the phase shifting of the phase shifter 1.

In some examples, the materials of the second dielectric substrate 131 and the third dielectric substrate 132 may be the same or different. For example, the second dielectric substrate 131 and the third dielectric substrate 132 may be made of glass. The second dielectric substrate 131 and the third dielectric substrate 132 each have a thickness in a range of about 0.29 mm to about 0.31 mm.

Figure 8:
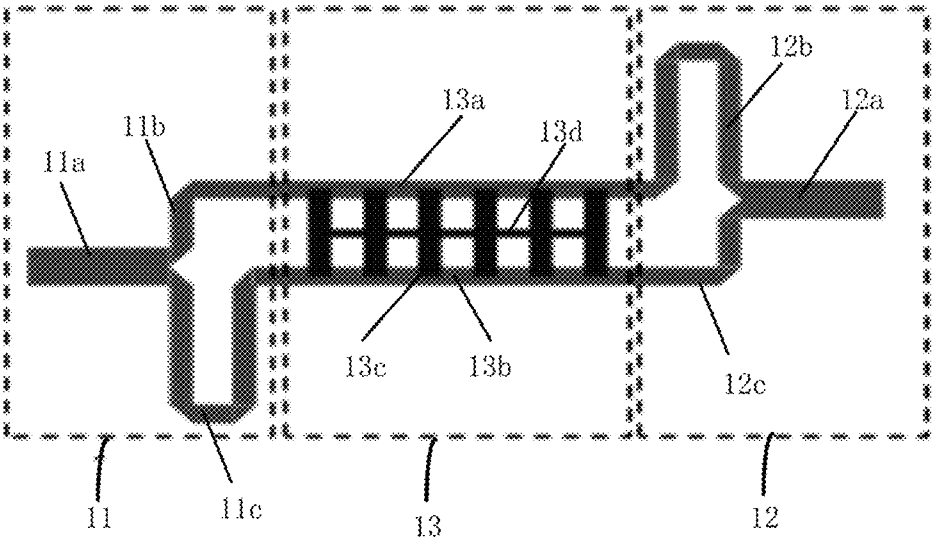
FIG. 8 is a schematic diagram of an exemplary phase shifter according to an embodiment of the present disclosure.

In some examples, FIG. 8 is a schematic diagram of an exemplary phase shifter according to an embodiment of the present disclosure. As shown in FIG. 8, each of the first transmission structure 11 and the second transmission structure 12 includes a main line 11*a*/12*a*, a first branch 11*b*/12*b*, and a second branch 11*c*/12*c*; and the first branch 11*b* and the second branch 11*c* have a one-piece structure, and the first branch 11*b* and the second branch 11*c* adopt a meandering line. The main line 11*a* of the first transmission structure 11 is coupled to a corresponding second feed port 322 through a corresponding first opening 21: the first branch 11*b* of the first transmission structure 11 is electrically connected to one end of the first transmission line 13*a*: the second branch 11*c* of the first transmission structure 11 is electrically connected to one end of the second transmission line 13*b*. The main line 12*a* of the second transmission structure 12 is coupled to a corresponding first radiation portion 33*a* through a corresponding second opening 22: the first branch 12*b* of the second transmission structure 12 is electrically connected to the other end of the first transmission line 13*a*; the second branch 12*c* of the second transmission structure 12 is electrically connected to the other end of the second transmission line 13*b*.

Here, the first branch 11*b* and the second branch 11*c* of the first transmission structure 11 have different lengths, the first branch 12*b* and the second branch 12*c* of the second transmission structure 12 have different lengths: the first branch 11*b* of the first transmission structure 11 and the second branch 12*c* of the second transmission structure 12 have the same length, and the second branch 11*c* of the first transmission structure 11 and the first branch 12*b* of the second transmission structure 12 have the same length. A difference between the lengths of the first branch and the second branch of the first transmission structure 11 or the second transmission structure 12 determines a phase difference of the radio frequency signals transmitted in the first branch and the second branch. For example: the difference between the lengths of the first branch 11*b* and the second branch 11*c* of the first transmission structure 11 causes a phase difference of 180° of the radio frequency signals transmitted in the first branch 11*b* and the second branch 11*c*: the difference between the lengths of the first branch 12*b* and the second branch 12*c* of the second transmission structure 12 causes a phase difference of 180° of the radio frequency signals transmitted in the first branch 12*b* and the second branch 12*c*. When the antenna receives radio frequency signals, the radio frequency signals are fed in through the main line of the first transmission structure 11, and are transmitted by the first branch 11*b* and the second branch 11*c* of the first transmission structure 11, causing the phase difference of 180° of the radio frequency signals transmitted in the first branch 11*b* and the second branch 11*c*; and then the radio frequency signals are restored by the first branch 12*b* and the second branch 12*c* of the second transmission structure 12, so that the radio frequency signals transmitted in the first branch 12*b* and the second branch 12*c* of the second transmission structure 12 to the main line 12*a* of the second transmission structure 12 have the same amplitude and phase.

The main line 11*a*, the first branch 11*b*, and the second branch 11*c* of the first transmission structure 11, the main line 12*a*, the first branch 12*b*, and the second branch 12*c* of the second transmission structure 12, and the first transmission line 13*a* and the second transmission line 13*b* are disposed in the same layer. The first transmission structure 11 receives the radio frequency signal fed from the second feed port 322 through the first opening 21, that is, the main line 11*a* receives the radio frequency signal fed from the second feed port 322 through the first opening 21, the main line 11*a* transmits the radio frequency signal to the phase shifting structure 13 through the first branch 11*b* and the second branch 11*c* for phase shifting, and the second transmission structure 12 receives the radio frequency signal phase-shifted by the phase shifting structure 13 and feeds the phase-shifted radio frequency signal to the first radiation portion 33*a* through the second opening 22.

In the embodiment of the present disclosure, the second feed port 322 is coupled to the corresponding first transmission structure 11, and the second transmission structure 12 is coupled to the corresponding first radiation portion 33*a*, so that a non-hole signal transmission is achieved in such a non-contact coupling manner.

In addition, the main line 11*a*, the first branch 11*b* and the second branch 11*c* of the first transmission structure 11, the main line 12*a*, the first branch 12*b* and the second branch 12*c* of the second transmission structure 12, and the first transmission line 13*a* and the second transmission line 13*b* are disposed in the same layer. In this case, the first branch 11*b* of the first transmission structure 11 and one end of the first transmission line 13*a* may have a one-piece structure, the second branch 11*c* of the first transmission structure 11 and one end of the second transmission line 13*b* may have a one-piece structure, the first branch 12*b* of the second transmission structure 12 and the other end of the first transmission line 13*a* may have a one-piece structure, and the second branch 12*c* of the second transmission structure 12 and the other end of the second transmission line 13*b* may have a one-piece structure.

In some examples, the first and second transmission structures 11 and 12 may employ a BALUN component. The BALUN (balance-unbalance) component is a three-port device that can be applied in a microwave radio frequency device, and is a radio frequency transmission line transformer that converts a matching input into a differential input, and can be used for exciting a differential line, an amplifier, a wideband antenna, a balanced mixer, a balanced frequency multiplier and a modulator, a phase shifter 1, and any circuit design that requires a transmission for signals with a same amplitude and a phase difference of 180° on two lines. Two outputs of the BALUN component have a same amplitude and opposite phases. In the frequency domain, this means that there is a phase difference of 180° between the two outputs: in the time domain, this means that a voltage of one balanced output is a negative value of the other balanced output.

Figure 9:
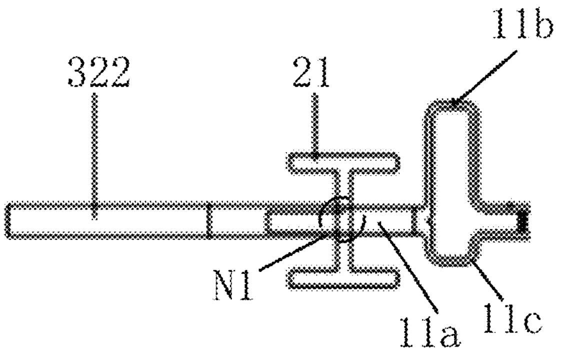
FIG. 9 is a schematic diagram showing a coupling between a feed structure and a phase shifter according to an embodiment of the present disclosure.

FIG. 9 is a schematic diagram showing a coupling between a feed structure and a phase shifter according to an embodiment of the present disclosure. As shown in FIG. 9, the main line 11*a*, the first branch 11*b* and the second branch 11*c* of the first transmission structure 11 are disposed in the same layer and on the side of the second dielectric substrate 131 close to the liquid crystal layer 1*c*. An orthographic projection of the main line 11*a* of the first transmission structure 11 on the third dielectric substrate 132 partially overlaps with an orthographic projection of one corresponding first opening 21 on the third dielectric substrate 132 at an intersection point denoted as N1. An extending direction of the orthographic projection of the main line 11*a* of the first transmission structure 11 on the third dielectric substrate 132 is located between extending directions of orthographic projections of the first branch 11*a* and the second branch 11*c* of the first transmission structure 11 on the third dielectric substrate 132. An orthographic projection of the second feed port 322 of the feed structure 32 on the third dielectric substrate 132 and the orthographic projection of the main line 11*a* of the first transmission structure 11 on the third dielectric substrate 132 partially overlap with each other, and overlap with an orthographic projection of the corresponding first opening 21 on the third dielectric substrate 132 at the intersection point N1.

It should be noted that only one example of the BALUN component is given above, but it should be understood that the BALUN component includes not only the above exemplary structures, but also any three-port BALUN component can be applied in the antenna of the embodiments of the present disclosure, so the above exemplary BALUN components do not limit the protection scope of the embodiments of the present disclosure.

In some examples, in order to increase a capacitance of an equivalent circuit of the structure so that the phase shifter 1 can provide a larger phase shift amount for a same changed value of the dielectric constant, for example, a phase shift amount of 360°, the phase shifters 1 in the phase shifting unit 10 are flush with each other on the outer side, or there is at least one phase shifter 1 of the plurality of phase shifters 1 which extends beyond other phase shifters 1 flush with each other on the outer side by a distance less than 10% of the length of the phase shifter 1.

According to the embodiment of the present disclosure, by loading the bias voltage to the liquid crystal phase shifters 1, the accurate control and the independent regulation and control of the excitation phase of each antenna unit 33 can be realized, so that the beam scanning function of the circularly polarized liquid crystal phased array antenna is realized.

Figure 10:
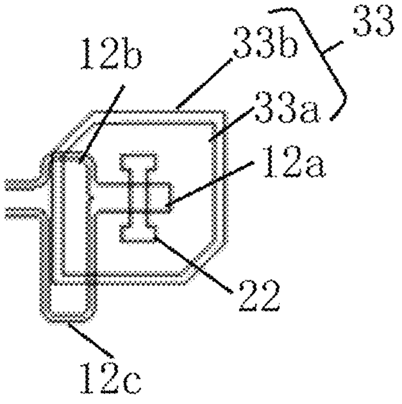
FIG. 10 is a schematic diagram of an antenna unit according to an embodiment of the present disclosure.

In some examples, FIG. 10 is a schematic diagram of an antenna unit according to an embodiment of the present disclosure. The antenna unit 33 includes a first radiation portion 33*a* and a second radiation portion 33*b*. As shown in FIGS. 1 and 10, the antenna substrate 3 further includes a fourth dielectric substrate 34 on a side of the first dielectric substrate 31 away from the reference electrode layer 2, and at least one second radiation portion 33*b* disposed on a side of the fourth dielectric substrate 34 away from the first dielectric substrate 31. Orthographic projections of the second radiation portion 33*b* and the first radiation portion 33*a* corresponding to each other on the first dielectric substrate 31 overlap with each other.

The first radiation portion 33*a* and the second radiation portion 33*b*, of which the orthographic projections on the first dielectric substrate 31 overlap with each other, are located in different dielectric layers. The at least one first radiation portion 33*a* includes one or more first radiation portions 33*a*: the at least one second radiation portion 33*b* includes one or more second radiation portions 33*b*. In the embodiment of the present disclosure, as an example, the at least one first radiation portion 33*a* includes a plurality of first radiation portions 33*a*: the at least one second radiation portion 33*b* includes a plurality of radiation portions 33*b* for description. In addition, in the embodiment of the present disclosure, as an example, the number of the first radiation portions 33*a* and the number of the second radiation portions 33*b* are equal to each other, and the plurality of first radiation portions 33*a* are in a one-to-one correspondence with the plurality of second radiation portions 33*b*.

In transmitting a signal in the antenna, after receiving the phase-shifted radio frequency signal fed from the phase shifter 1, the first radiation portion 33*a* feeds the radio frequency signal to the second radiation portion 33*b* directly opposite to the first radiation portion 33*a*. It should be noted that a distance between the first radiation portion 33*a* and the second radiation portion 33*b* directly opposite to each other should satisfy the radiance requirement of the antenna.

In the embodiment of the present disclosure, the first radiation portions 33*a* are disposed on a side of the first dielectric substrate 31 close to the fourth dielectric substrate 34, that is, a dielectric substrate (that is, the fourth dielectric substrate 34) is provided between a layer where the first radiation portions 33*a* are located and a layer where the second radiation portions 33*b* are located, so that the dielectric constant of the antenna can be effectively increased.

In some examples, as shown in FIG. 10, an outline of each first radiation portion 33*a* and an outline of each second radiation portion 33*b* adopt a polygon shape, and any inner angle of the polygon shape is greater than or equal to 90°. The shape of each first radiation portion 33*a* and the shape of each second radiation portion 33*b* may be the same or different.

In the embodiment, as an example, the shape of each first radiation portion 33*a* and the shape of each second radiation portion 33*b* are hexagon for description. Specifically, the hexagon includes a first side, a second side, a third side, a fourth side, a fifth side and a sixth side which are connected in sequence: an extending direction of the first side is the same as that of the fourth side, and is perpendicular to that of the second side and that of the fifth side: extending directions of the third side and the sixth side are the same, and an angle between each of the extending directions of the third side and the sixth side and the extending direction of the first side is in a range from 44.5° to 45.5°.

For example, the first radiation portion 33*a* has a hexagon shape as the outline, wherein the hexagon shape is formed by cutting two diagonal corners of a square, each diagonal corner is an isosceles right triangle. The first side, the second side, the fourth side, and the fifth side have the same length, and the third side and the sixth side have the same length. In this case, the angle between each of the extending directions of the third side and the sixth side and the extending direction of the first side is 45°. The isosceles right triangle is used as the cut off corner of the square for forming the first radiation portion 33*a*, so that the impedance matching is achieved and the loss is reduced.

Further, as shown in FIG. 10, for the first radiation portion 33*a* and the second radiation portion 33*b* which are correspondingly arranged, the orthographic projection of the first radiation portion 33*a* on the first dielectric substrate 31 is located within the orthographic projection of the second radiation portion 33*b* on the first dielectric substrate 31. Further, orthographic projections of centers of the first radiation portion 33*a* and the second radiation portion 33*b* on the first dielectric substrate 31 coincide with each other.

In some examples, the first side, the second side, the fourth side and the fifth side of the first radiation portion 33*a* have the same length, which are all between 0.240 and 0.242 wavelength (between 0.240×wavelength and 0.242×wavelength or in a range from 0.240λ to 0.242λ) corresponding to the operating frequency of the antenna; the third side and the sixth side of the first radiation portion 33*a* have the same length, which are all between 0.073 and 0.074 wavelength corresponding to the operating frequency of the antenna. Lengths of the first side, the second side, the fourth side and the fifth side of the second radiation portion 33*b* are all between 0.272 and 0.274 wavelength corresponding to the operating frequency of the antenna; lengths of the third side and the sixth side of the second radiation portion 33*b* are both between 0.092 and 0.094 wavelength corresponding to the operating frequency of the antenna.

For example, the lengths of the first side, the second side, the fourth side, and the fifth side of the first radiation portion 33*a* are 0.241λ corresponding to the operating frequency of the antenna; a length of the right-angle side of the cut off isosceles right triangle is 0.052λ corresponding to the operating frequency of the antenna. Based on this, the lengths of the third side and the sixth side of the first radiation portion 33*a* are determined to be 0.073λ corresponding to the operating frequency of the antenna. The lengths of the first side, the second side, the fourth side and the fifth side of the second radiation portion 33*b* are 0.273λ corresponding to the operating frequency of the antenna; a length of the right-angle side of the cut off isosceles right triangle is 0.066λ corresponding to the operating frequency of the antenna. Based on this, the lengths of the third side and the sixth side of the second radiation portion 33*b* are determined to be 0.093λ corresponding to the operating frequency of the antenna.

Figure 11:
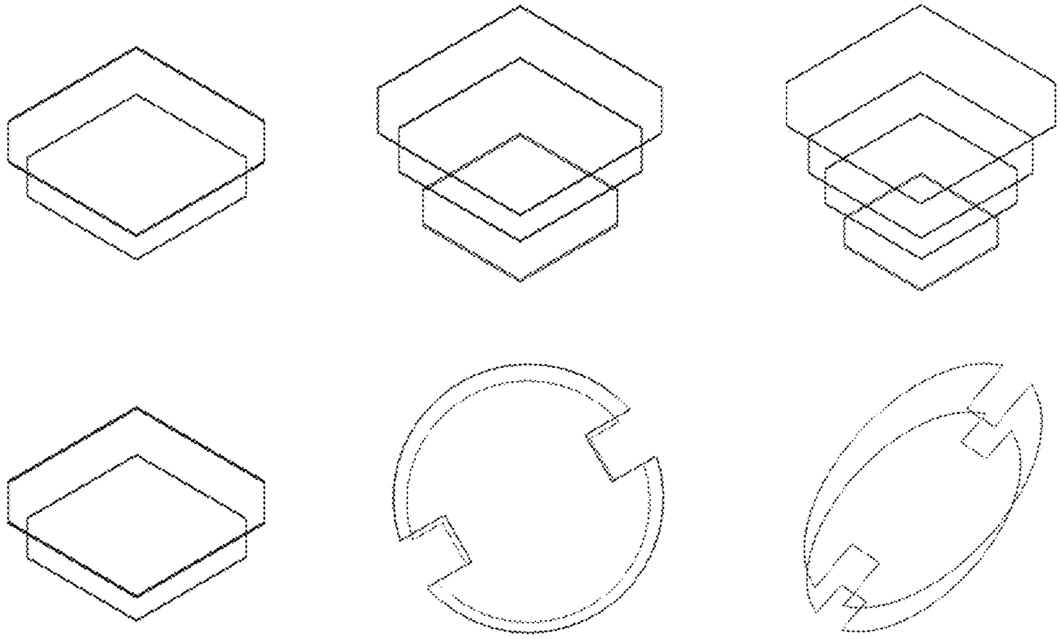
FIG. 11 is a schematic diagram illustrating antenna units 33 with different structures and shapes according some embodiments of the present disclosure.

In some examples, FIG. 11 is a schematic diagram of antenna units 33 with different structures and shapes according to an embodiment of the present disclosure. As shown in FIG. 11, the first radiation portion 33*a* and the second radiation portion 33*b* which are stacked may include, but be not limited to, a circular patch, an annular patch, a rectangular patch, etc. which are diagonally slotted, and the antenna operation performance may be improved according to the actual application scenario.

In some examples, as shown in FIG. 1, a first adhesive layer 4 is disposed between the first dielectric substrate 31 and the fourth dielectric substrate 34: the first adhesive layer 4 is configured to adhere the first dielectric substrate 31 and the fourth dielectric substrate 34. Specifically, the feed structure 32 and the at least one first radiation portion 33*a* are provided on the side of the first dielectric substrate 31 close to the fourth dielectric substrate, so that the first adhesive layer 4 is provided on the side of the first dielectric substrate 31 close to the fourth dielectric substrate 34 and is used for adhering the fourth dielectric substrate 34, the feed structure 32, the at least one first radiation portion 33*a* and the first dielectric substrate 31.

In some examples, the first dielectric substrate 31 and the fourth dielectric substrate 34 may employ a printed circuit board (PCB).

In some examples, a second adhesive layer 5 is provided between the antenna substrate 3 and the glass substrate (i.e., the first substrate 1*a* and the second substrate 1*c* in the phase shifting unit 10). Specifically, when the reference electrode layer 2 is disposed on the side of the antenna substrate 3 close to the first substrate 1*a*, the second adhesive layer 5 is disposed between the reference electrode layer 2 and the first substrate 1*a*, and is configured to attach the reference electrode layer 2 to the first substrate 1*a*. The materials of the first adhesive layer 4 and the second adhesive layer 5 may be the same or different. For example: the materials of the first adhesive layer 4 and the second adhesive layer 5 each may be an optically clear adhesive (OCA).

Figure 12:
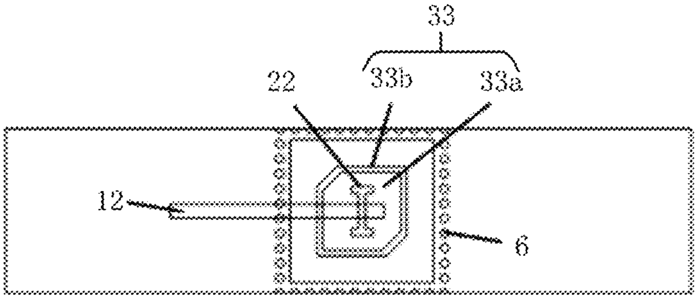
FIG. 12 is a schematic diagram illustrating a location of a first metal isolation pillar according to an embodiment of the present disclosure.

In some examples, FIG. 12 is a schematic diagram of a location of a first metal isolation pillar according to an embodiment of the present disclosure. As shown in FIG. 12, the antenna further includes a plurality of first metal isolation pillars 6 penetrating through the antenna substrate 3: an outline of an orthographic projection of the plurality of first metal isolation pillars 6 on the first dielectric substrate 31 surrounds the corresponding first radiation portion 33*a*, and surrounds the corresponding second radiation portion 33*b*, namely, the outline of the orthographic projection of the first metal isolation pillars 6 on the first dielectric substrate 31 surrounds the corresponding antenna unit 33. Such a cavity structure provided around the antenna unit 33 can make the radiation pattern of the antenna unit 33 more gentle, and thus the antenna unit 33 including the first radiation portion 33*a* and the second radiation portion 33*b* stacked together can have a wide-angle scanning performance.

It should be noted that in the embodiment of the present disclosure, as an example, the antenna unit 33 is a circularly polarized antenna unit 33 for the detailed description.

In some examples, a ratio of a radius of the first metal isolation pillar 6 to a distance between any two adjacent first metal isolation pillars 6 is between 0.25 and 0.5. Specifically, the ratio of the radius of the first metal isolation pillar 6 to the distance between any two adjacent first metal isolation pillars 6 is 0.29.

A side length of a square cavity defined by the first metal isolation pillars 6 is equal to a distance between centers of the any two adjacent antenna units 33, and the square cavity can effectively enhance the isolation between the adjacent antenna units 33 and improve the operating stability of the circularly polarized antenna units 33.

Figure 13:
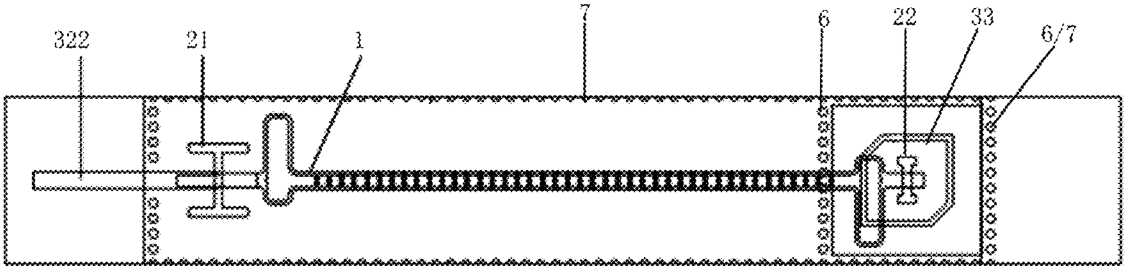
FIG. 13 is a schematic diagram illustrating a location of a second metal isolation pillar according to an embodiment of the present disclosure.

In some examples, FIG. 13 is a schematic diagram of a location of a second metal isolation pillar according to an embodiment of the present disclosure. As shown in FIG. 13, the antenna includes a plurality of second metal isolation pillars 7 penetrating through the antenna substrate 3: an outline of an orthographic projection of the plurality of second metal isolation pillars 7 on the first dielectric substrate 31 surrounds the corresponding phase shifter 1. The cavity structure provided around the phase shifter 1 can isolate the energy interference generated by the feed structure 32 located in the same layer, which significantly improves the operating stability of the circularly polarized antenna units 33.

In some examples, a ratio of a radius of the second metal isolation pillar 7 to a distance between any two adjacent second metal isolation pillars 7 is between 0.25 and 0.5. Specifically, the ratio of the radius of the second metal isolation pillar 7 to the distance between any two adjacent second metal isolation pillars 7 is 0.29.

The second metal isolation pillars 7 include some first metal isolation pillars 6. The first metal isolation pillars 6 and the second metal isolation pillars 7 each adopt a square cavity structure, so that the directional beam scanning angle in a range from −60° to 60° C. an be realized; and the circularly polarized radiation performance with an axial ratio smaller than 3 dB is obtained within a scanning angle in a range from –40° to 40° in a frequency band of 25.5 GHz to 26 GHZ.

Figure 14A:
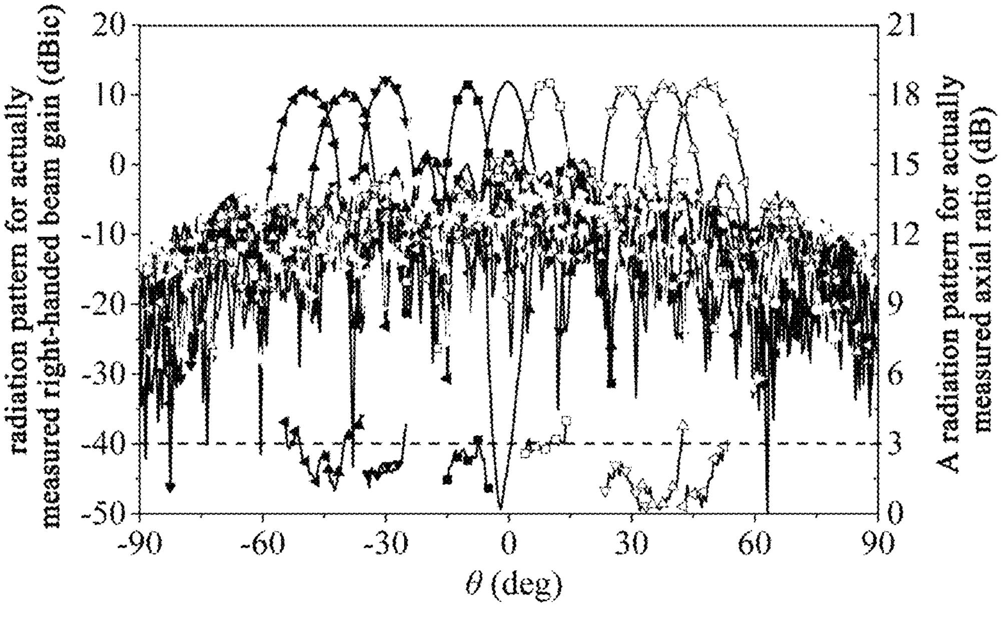
FIG. 14*a* to FIG. 14*c* are respectively gain radiation patterns of a liquid crystal phase shifter 1 actually measured at scanning angles of −60° to 60° at three frequency points of 25.5 GHZ, 25.75 GHz, and 26 GHz according to an embodiment of the present disclosure.
Figure 14B:
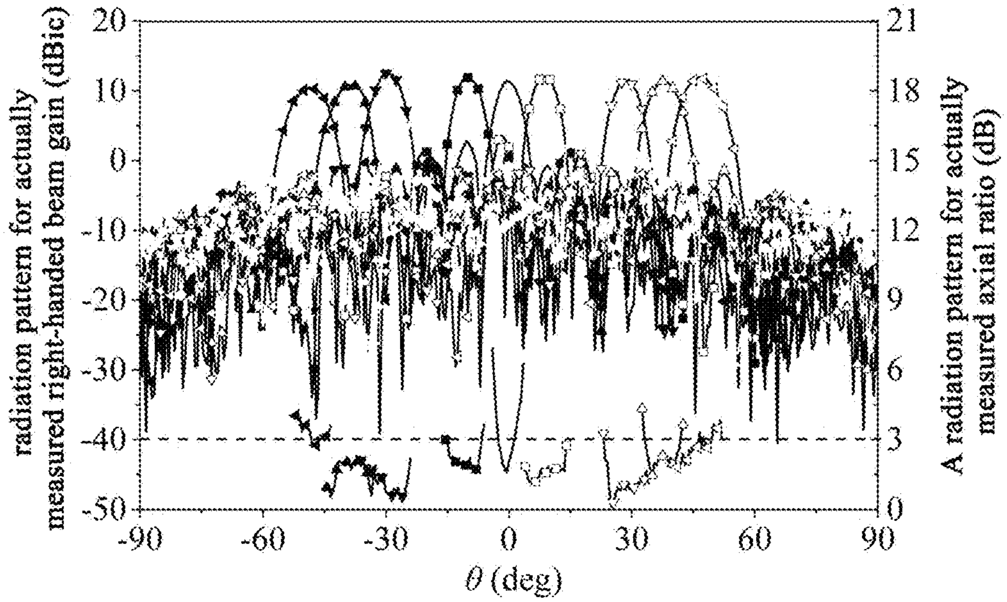
Figure 14C:
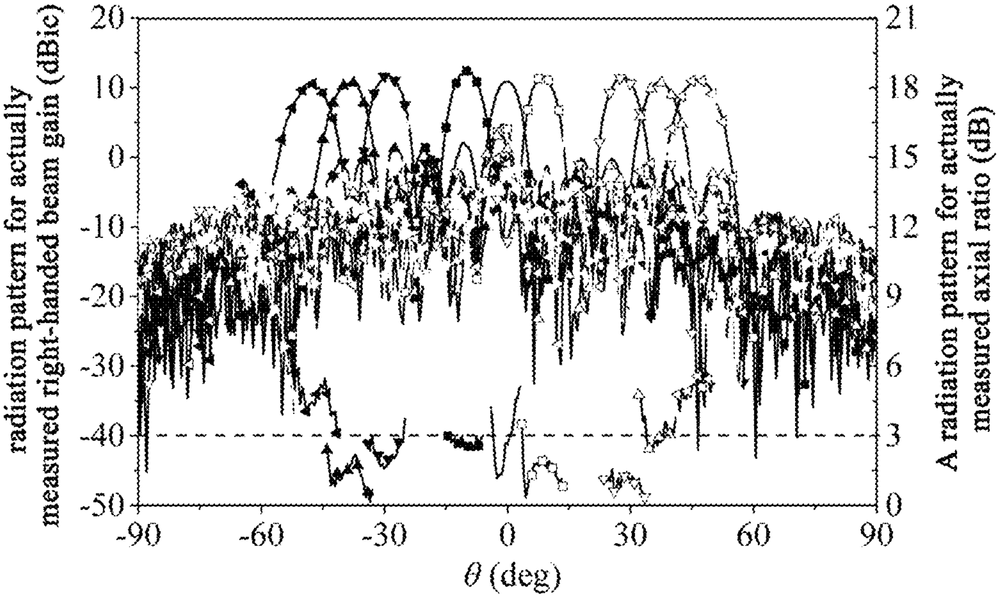
Figure 15A:
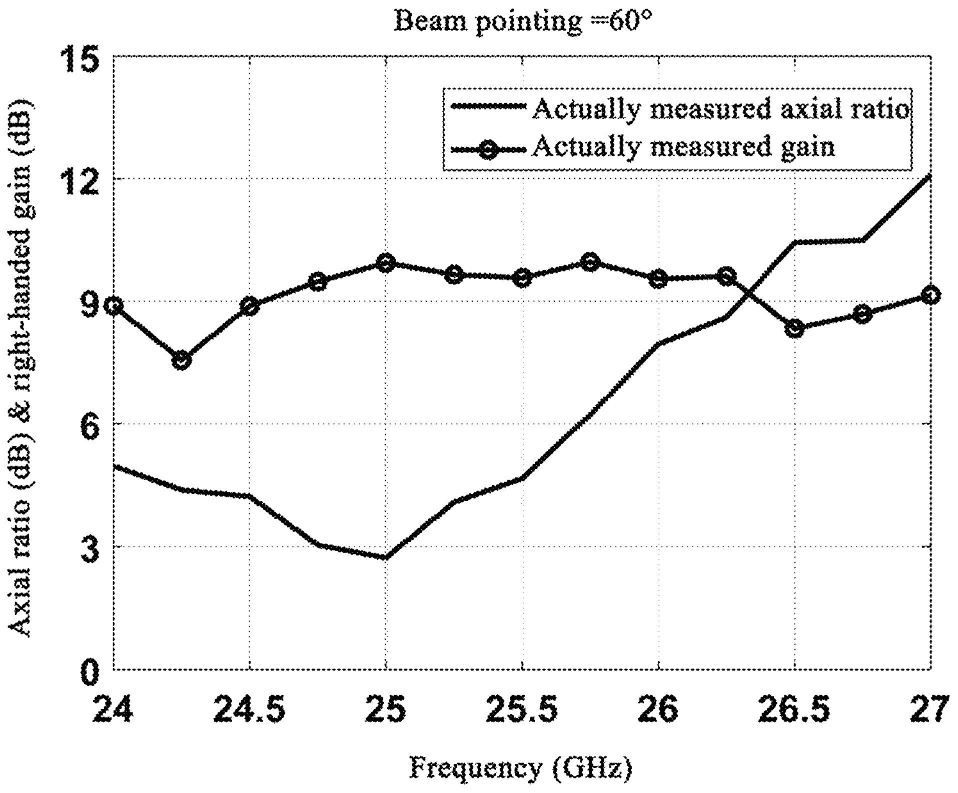
FIG. 15*a* to FIG. 15*m* are schematic diagrams each illustrating a curve for an axial ratio and a gain varying with a frequency of a liquid crystal phase shifter 1 actually measured at each of multiples of 10° in a beam scanning angle range of −60° to 60° according to an embodiment of the present disclosure.
Figure 15B:
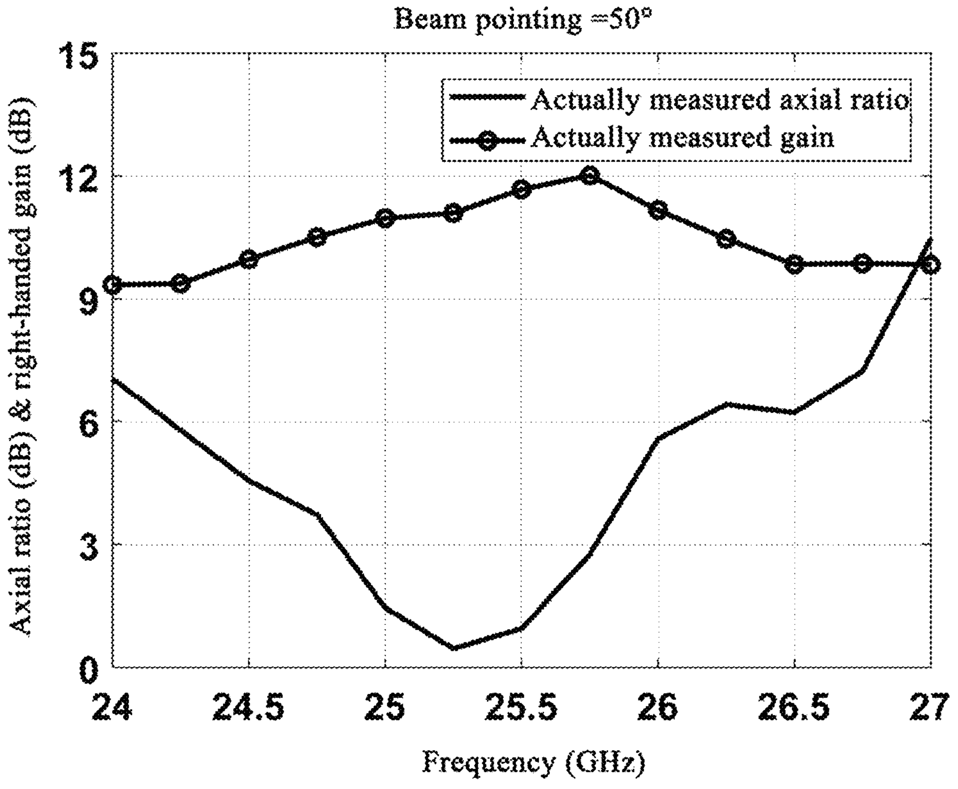
Figure 15C:
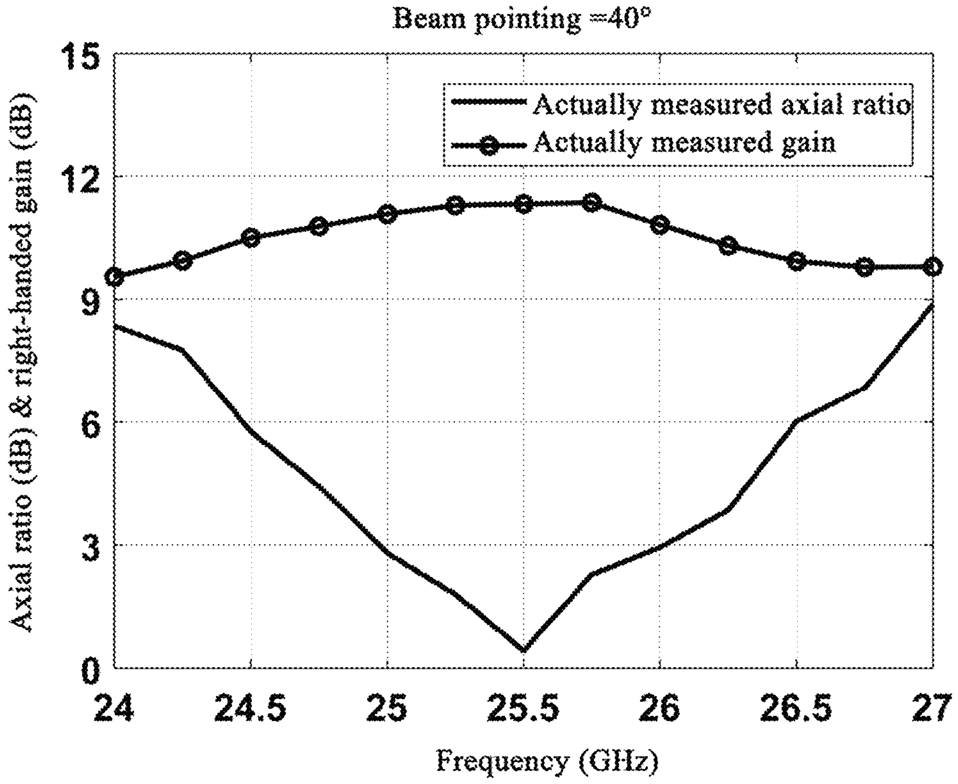
Figure 15D:
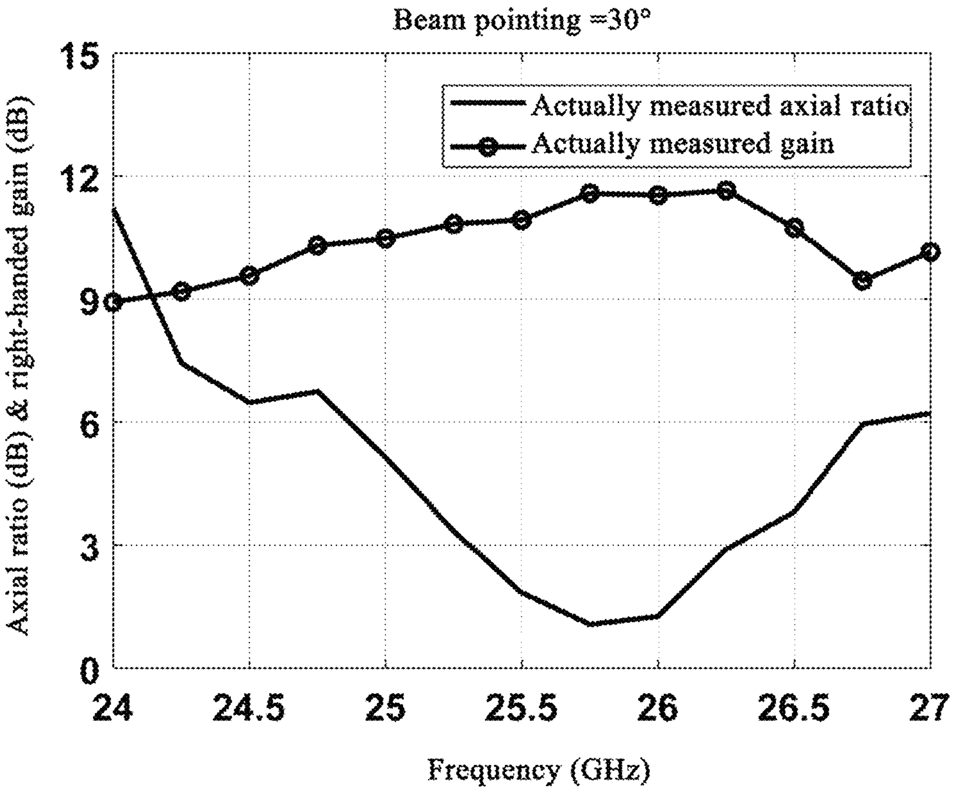
Figure 15E:
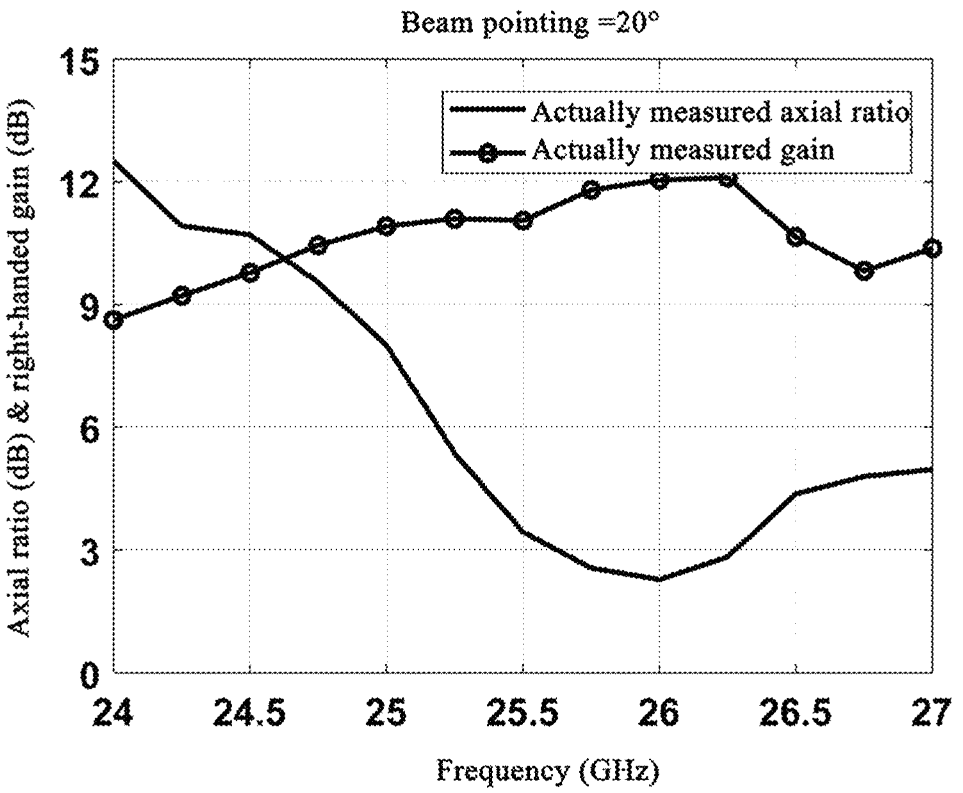
Figure 15F:
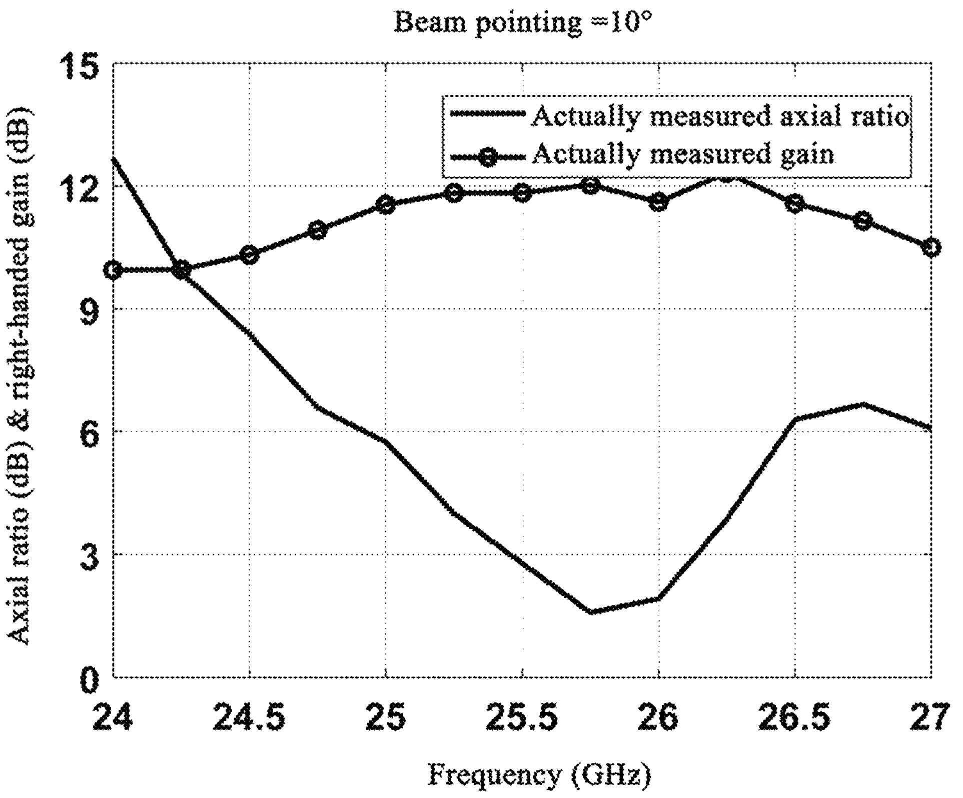
Figure 15G:
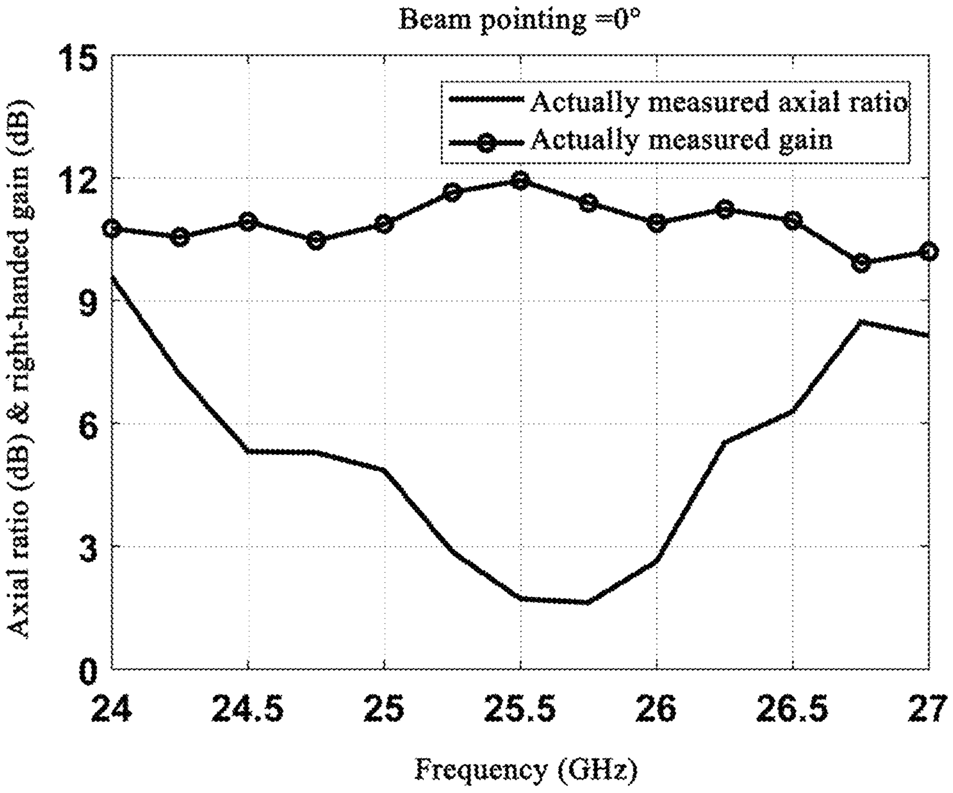
Figure 15H:
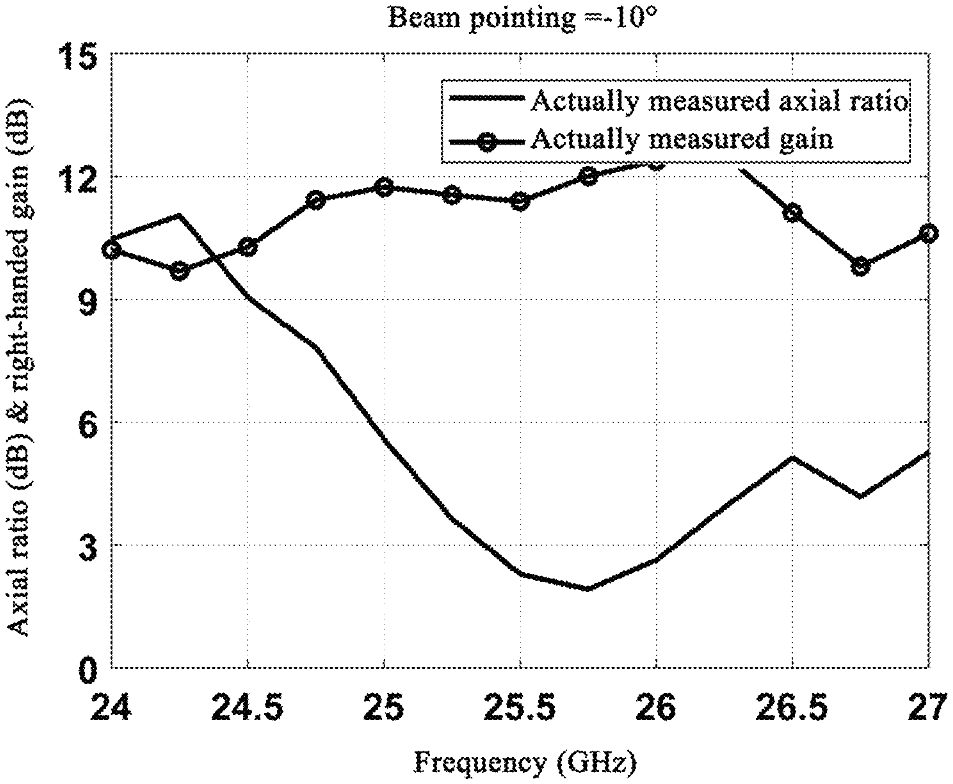
Figure 15I:
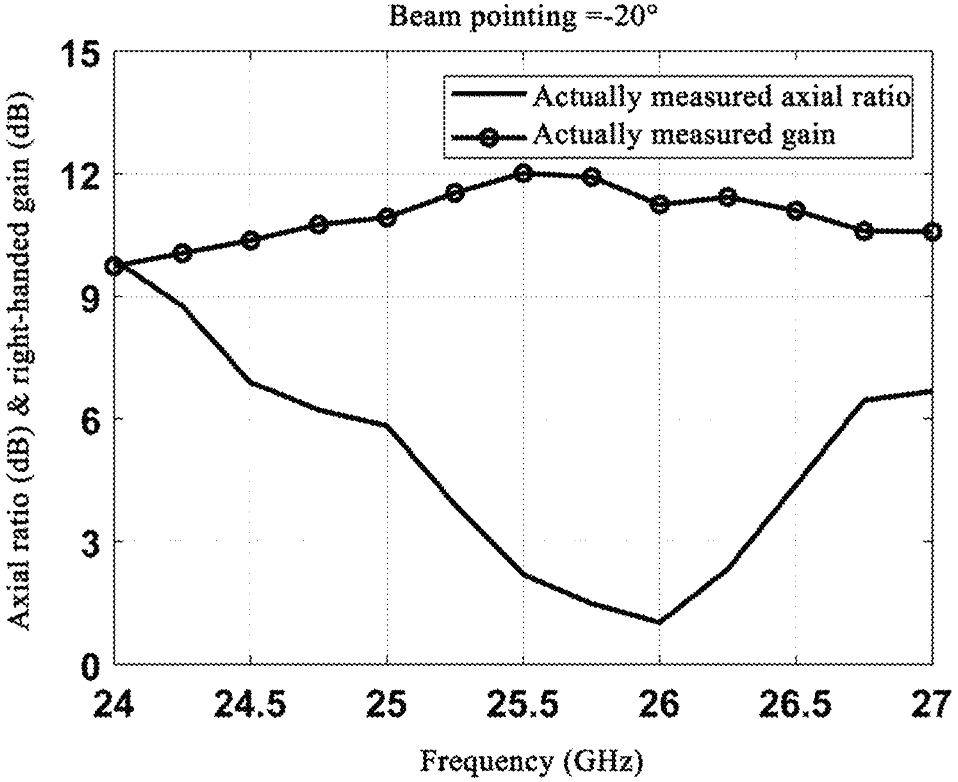
Figure 15J:
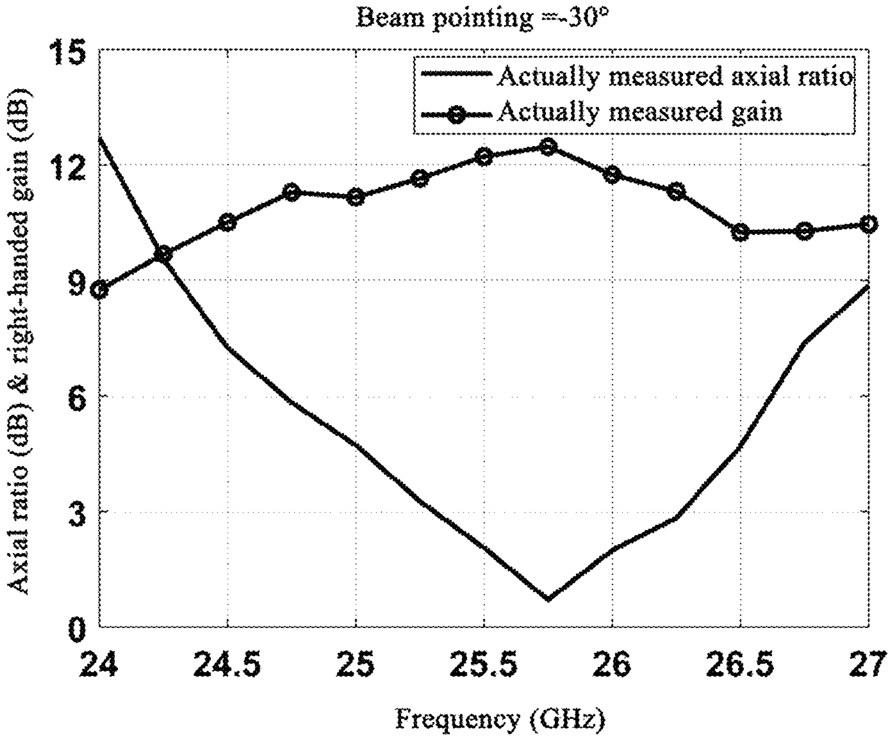
Figure 15K:
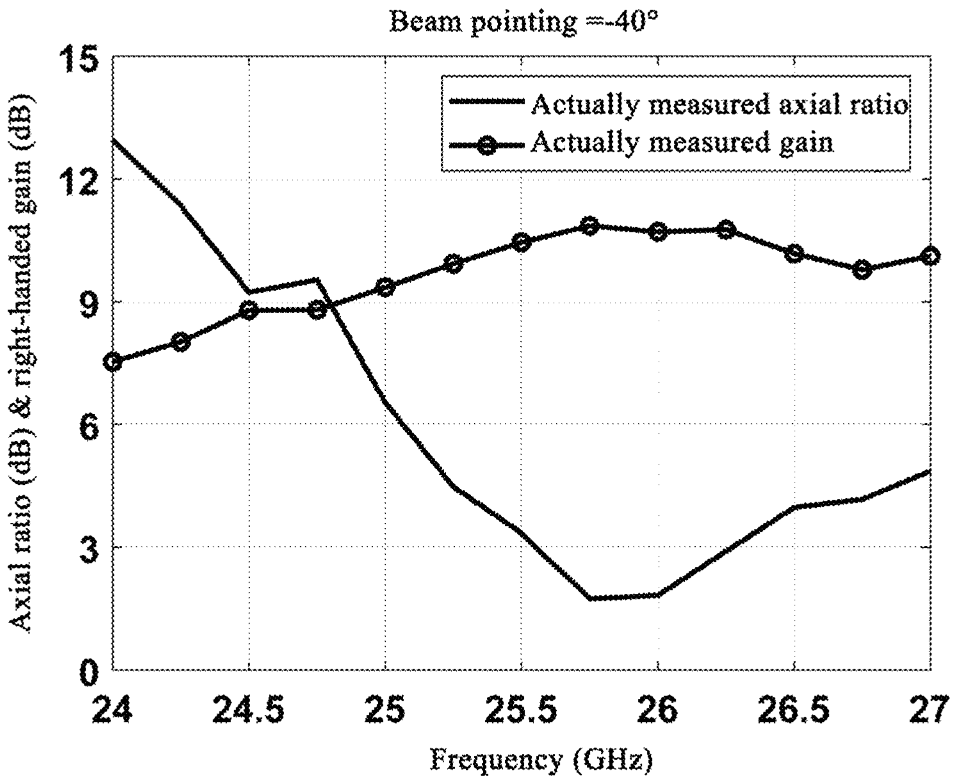
Figure 15L:
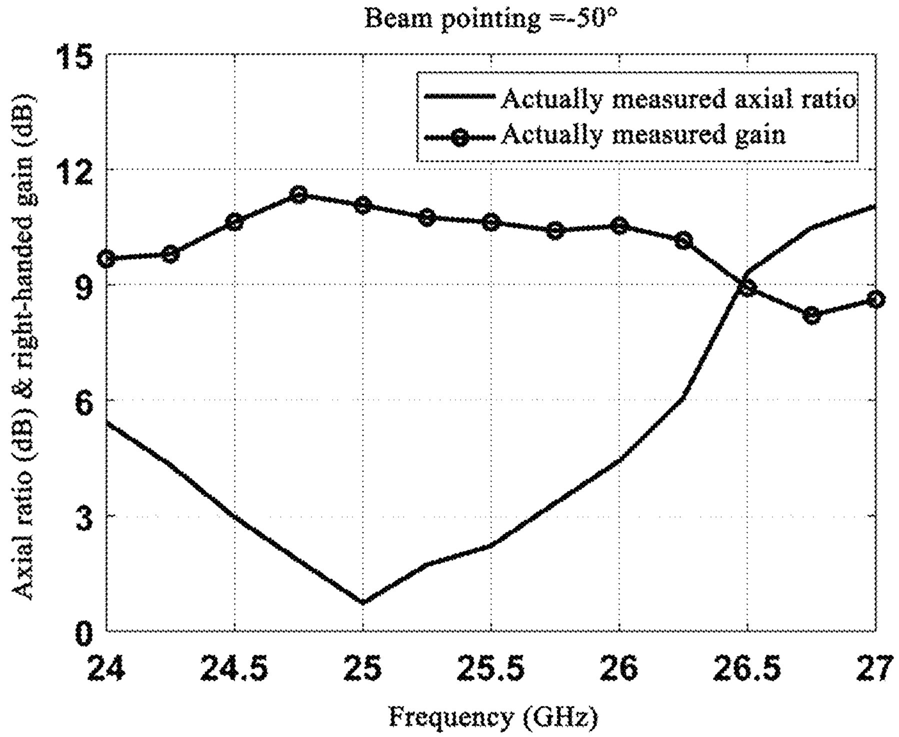
Figure 15M:
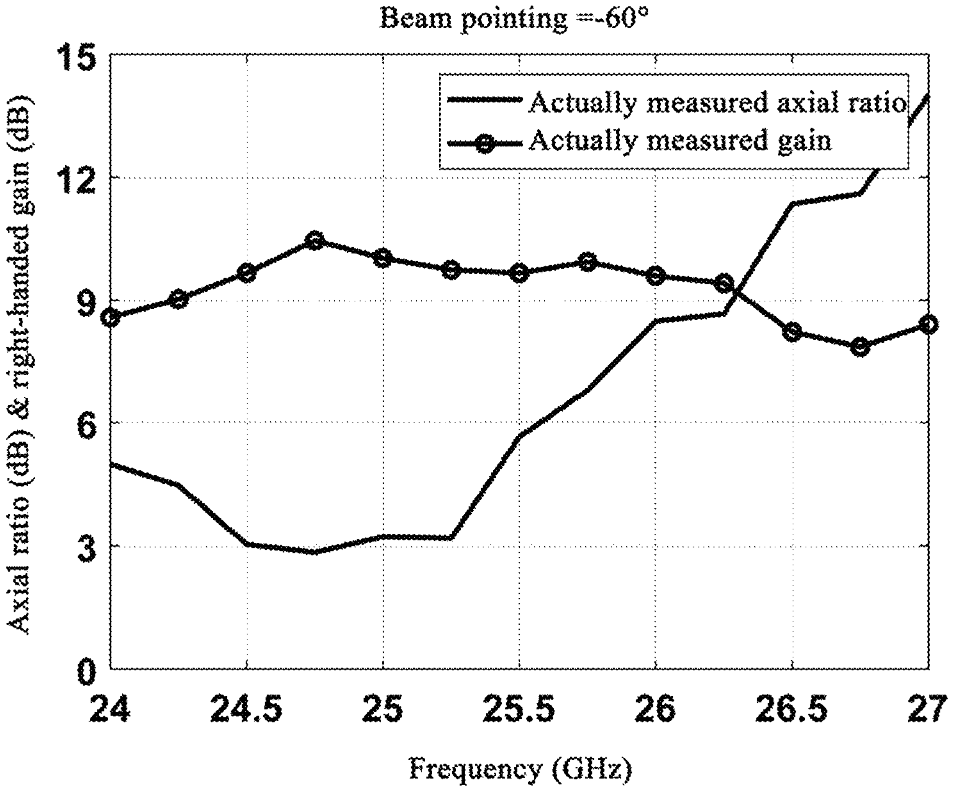

FIG. 14*a* to FIG. 14*c* are respectively gain radiation patterns of a liquid crystal phase shifter 1 actually measured at scanning angles of –60° to 60° at three frequency points of 25.5 GHZ, 25.75 GHz, and 26 GHz according to an embodiment of the present disclosure. As shown in FIG. 14, the side lobe below −10 dB can be obtained and the gain fluctuation is less than 3 dB within a scanning angle in a range from –60° to 60° in the antenna; the gain fluctuation is less than 2 dB within a scanning angle of –40° to 40°, the axial ratio of the main lobe direction is below 3 dB, and the corresponding cross polarization is below −15 dB.

FIG. 15*a* to FIG. 15*m* are schematic diagrams each illustrating a curve for an axial ratio and a gain varying with a frequency of a liquid crystal phase shifter 1 actually measured every 10° of a beam scanning angle in a range of –60° to 60° according to an embodiment of the present disclosure. As shown in FIG. 15, the gain above 10 dB and the axial ratio below 6 dB can be obtained in the antenna within a scanning angle in a range from –60° to 60° in a frequency band of 25 GHz to 26 GHZ. The axial ratio of 3 dB and the maximum gain of 12 dB can be obtained within a scanning angle in a range from –40° to 40°.

The embodiment of the present disclosure provides a circularly polarized phased array antenna based on a transmission type liquid crystal phase shifter 1, which can realize the circularly polarized scanning in a range from –40° to 40° in a frequency band of 25 GHz to 26 GHZ, and provide the maximum gain of 12 dB, wherein the gain fluctuation is less than 3 dB in the scanning range. In this case, the antenna has the advantages of high response speed, low cost, integration and the like.

In some embodiments, as shown in FIG. 5, the feed structure 32 includes first feed lines 32*a* of n stages: each first feed line 32*a* at the (m−1)th stage is connected to two first feed lines 32*a* at the m-th stage: where n≥2, 2≤m≤n, and both m and n are integers. The connector 81 is electrically connected to the first feed line 32*a* at the 1st stage.

Figure 16:
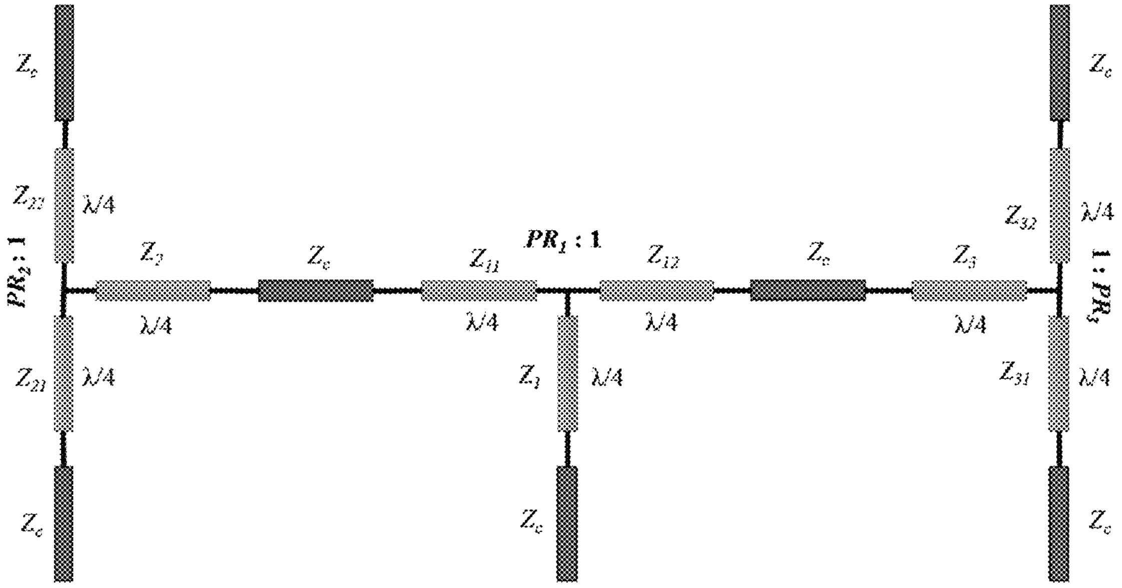
FIG. 16 is a schematic diagram of a circuit topology of an unequal power divider according to an embodiment of the present disclosure.

The feed structure 32 may be a one-to-sixteen power divider. Specifically, the feed structure 32 is formed by mutually cascading one-to-two power dividers of 4 stages. The first feed lines 32*a* at the nth stage includes $2^n$ first feed lines 32*a*. FIG. 16 shows the first feed lines 32*a* of 4 stages, wherein an end of each first feed line 32*a* at the fourth stage may be used as the second feed port 322 and be coupled to a corresponding first transmission structure 11 through a corresponding first opening 21. Each first feed line 32*a* at the third stage is connected to two first feed lines 32*a* at the fourth stage. Each first feed line 32*a* at the second stage is connected to two first feed lines 32*a* at the third stage. The first feed line 32*a* at the first stage is connected to two first feed lines 32*a* at the second stage. The first feed line 32*a* at the first stage is electrically connected to the connector 81 through the first feed port 321. Alternatively, the first feed line 32*a* at the first stage is connected to a radio frequency connector through the first feed port 321 for testing the antenna in an earlier stage.

It should be noted that, impedances of the first feed lines 32*a* at each stage may be the same or different. In the embodiment of the present disclosure, as an example, in order to reduce the complexity of the feed structure 32, the impedances of the first feed lines 32*a* is the same for description. Therefore, the first feed lines 32*a* at the nth stage can output the radio frequency signals having the uniform phases with the same amplitude.

In some examples, each first feed line 32*a* is a strip-line, and the first feed port 321 may be a transition structure for converting the strip-line to the micro-strip.

For example, the connector 81 may include, but be not limited to, an ELC (End Luanch Connector) connector 81, such as a connector available from the Southwestern Microwave company.

In some examples, to increase the degree of freedom in the power divider circuit design and reduce the side lobe, the first feed lines 32*a* having different impedances may be provided. FIG. 16 is a schematic diagram of a circuit topology of an unequal power divider according to an embodiment of the present disclosure. As shown in FIG. 16, for a power ratio PRx of the first feed line 32*a* at each stage, characteristic impedances of portions of two first feed lines 32*a* at a same stage connected to a same first feed line 32*a* are $$Z_{x1}=\sqrt{\frac{1+PR_x}{PR_x}}Z_c \text{ and } Z_{x2}=\sqrt{\frac{1+PR_x}{1}}Z_c,$$

respectively, where the portions have a quarter-wavelength distance from the end of the same first feed line 32*a* to which the portions are connected. Where x represents the stage at which the same first feed line 32*a* to which the portions are connected is located; and $Z_c$ represents a characteristic impedance such as having a value of 50 ohms. Taking the Chebyshev taper distribution as an example, if normalized weights of feed amplitudes of 16 antenna units 33 are 0.867, 0.504, 0.622, 0.733, 0.833, 0.914, 0.971, 1.0, 1.0, 0.971, 0.914, 0.833, 0.733, 0.622, 0.504, and 0.867, respectively, the resultant far-field beam scanning radiation pattern has a side lobe level which can be suppressed from −13 dB to −20 dB for uniform distribution.

In some examples, as shown in FIG. 5, the antenna substrate 3 further includes at least two second feed lines 32*b* disposed on a side of the first dielectric substrate 31 away from the reference electrode layer 2: the at least two second feed lines 32*b* are respectively provided at positions of the feed structure 32 away from a center of the antenna substrate 3.

It should be noted that the second feed lines 32*b* are provided in pairs, for example, 1 pair, 2 pairs or more pairs. Each pair of the second feed lines 32*b* are disposed at positions of the feed structure 32 away from the center of the antenna substrate 3 (i.e., the antenna), and at the same distance from the center of the antenna substrate 3. Without largely increasing the complexity, the operation performance (e.g., the matching performance and the axial ratio of the antenna, etc.) of the unit is more ideal, and the embodiment of the present disclosure provides one pair of second feed lines 32*b*.

In some examples, as shown in FIG. 5, each second feed line 32*b* is electrically connected to a corresponding connector 82.

The first substrate 1*a* further includes third transmission lines 14 disposed on a side of the second dielectric substrate 131 close to the tunable dielectric layer 1*b*: each second feed line 32*b* is electrically connected to the corresponding third transmission line 14 through a corresponding first opening 21. The antenna substrate 3 further includes at least two dummy units 35: each dummy unit 35 includes a third radiation portion 35*a* provided on a side of the first dielectric substrate 31 away from the reference electrode layer 2, and a fourth radiation portion provided on a side of the fourth dielectric substrate 34 away from the first dielectric substrate 31: each third transmission line 14 is electrically connected to the third radiation portion 35*a* of a corresponding dummy unit 35 through a corresponding second opening 22. It should be noted that the dummy units do not receive the microwave signal and therefore do not radiate a signal.

Specifically, the second feed line 32*b* may employ a strip-line, and the third transmission line 14 may employ a micro-strip line. One end of each second feed line 32*b* may be coupled to the corresponding third transmission line 14 through a corresponding first opening 21. The third transmission line 14 is coupled to a corresponding dummy unit 35 through a corresponding second opening 22. The first feed port 321 may be connected to the other end of the corresponding second feed line 32*b* and be used as a transition structure for converting the strip-line to the micro-strip.

A thickness of the antenna provided by the embodiment of the present disclosure is in a range from 1.531 mm to 1.5312 mm, that is, 0.128 times of the wavelength at the operating frequency of 25 GHZ of the antenna. Compared with the traditional phased array antenna or the existing liquid crystal phased array antenna, in the embodiment of the present disclosure, it does not need to integrate a radio frequency phase shifting chip, which can simplify the design complexity, and reduce the cost of the phased array antenna.

Based on the same inventive concept, an embodiment of the present disclosure further provides an electronic device, including the antenna provided in the above embodiments, and therefore, a principle of a problem solved by the electronic device in the embodiment of the present disclosure is similar to that of the above antenna in the embodiment of the present disclosure. Based on this, the specific description for the electronic device in the embodiment of the present disclosure may be referred to the description for the above antenna, and is not repeated here.

The electronic device includes a control unit in addition to the antenna. The control unit is configured to load a bias voltage to the phase shifters 1 in the antenna.

The control unit is electrically connected to the antenna through a flexible flat cable. Specifically, the control unit is electrically connected to the first branches, the second branches and the patch electrodes 13*c* of the phase shifters 1 in the antenna through the flexible flat cable, and is configured to load a bias voltage to the first branches, the second branches and the patch electrodes 13*c*, so that the first branches and the second branches form capacitors with the patch electrodes 13*c*.

For example, the control unit may include a separate power control board based on a field programmable gate array (FPGA) chip.

The antenna and the control unit are provided in the embodiment of the present disclosure, which is convenient for performs antenna tests and experiments: the same antenna structure can be controlled by using different control units, thereby realizing a higher compatibility.

Based on the actual application scene, considering that the integration of the whole system is improved and the product size is reduced, the control unit and the antenna can be integrated on the same printed circuit board, so that the display feedback function of the control unit can be increased, and the current power-on state can be fed back in real time.

It should be understood that the above embodiments are merely exemplary embodiments adopted to explain the principles of the present disclosure, and the present disclosure is not limited thereto. It will be apparent to one of ordinary skill in the art that various changes and modifications may be made therein without departing from the spirit and scope of the present disclosure, and such changes and modifications also fall within the scope of the present disclosure.

What is claimed is:

1. An antenna, comprising: a phase shifting unit, a reference electrode layer, and an antenna substrate which are stacked together; wherein the phase shifting unit comprises at least one phase shifter, each of which comprises a first transmission structure, a second transmission structure, and a phase shifting structure between the first transmission structure and the second transmission structure;

the reference electrode layer is provided with at least one first opening and at least one second opening therein;

the antenna substrate comprises a first dielectric substrate, and a feed structure and at least one first radiation portion on a side of the first dielectric substrate away from the reference electrode layer; the feed structure comprises at least one first feed port and at least one second feed port; and for the phase shifter, the first transmission structure is electrically connected to a corresponding second feed port through a corresponding first opening; and the second transmission structure is electrically connected to a corresponding first radiation portion through a corresponding second opening;

wherein the phase shifting structure comprises a first substrate and a second substrate opposite to each other, and a tunable dielectric layer between the first substrate and the second substrate; wherein the first substrate comprises a second dielectric substrate and a first transmission line and a second transmission line on a side of the second dielectric substrate close to the tunable dielectric layer; and the second substrate comprises a third dielectric substrate and a plurality of patch electrodes on a side of the third dielectric substrate close to the tunable dielectric layer, the plurality of patch electrodes are arranged side by side in an extending direction of the first transmission line, and orthographic projections of the plurality of patch electrodes on the second dielectric substrate overlap with orthographic projections of the first transmission line and the second transmission line on the second dielectric substrate.

2. The antenna of claim 1, wherein each of the first transmission structure and the second transmission structure comprises a main line, a first branch, and a second branch; and the first branch and the second branch of the first transmission structure have a one-piece structure, the first branch and the second branch of the second transmission structure have a one-piece structure, and the first branch and the second branch of both the first transmission structure and the second transmission structure each adopt a shape of a meandering line;

the main line of the first transmission structure is coupled to a corresponding second feed port through a corresponding first opening; the first branch of the first transmission structure is electrically connected to one end of the first transmission line; and the second branch of the first transmission structure is electrically connected to one end of the second transmission line; and the main line of the second transmission structure is coupled to a corresponding first radiation portion through a corresponding second opening; the first branch of the second transmission structure is electrically connected to the other end of the first transmission line; and the second branch of the second transmission structure is electrically connected to the other end of the second transmission line.

3. The antenna of claim 1, wherein the antenna substrate further comprises a fourth dielectric substrate on a side of the first dielectric substrate away from the reference electrode layer, and at least one second radiation portion on a side of the fourth dielectric substrate away from the first dielectric substrate; and orthographic projections of the second radiation portion and the first radiation portion corresponding to each other on the first dielectric substrate overlap with each other.

4. The antenna of claim 3, further comprising a first adhesive layer between the first dielectric substrate and the fourth dielectric substrate, wherein the first adhesive layer is configured to attach the first dielectric substrate to the fourth dielectric substrate.

5. The antenna of claim 1, wherein the feed structure comprises first feed lines of n stages; and one first feed line at an (m−1)th stage is connected to two first feed lines at an m-th stage; where $n \geq 2 \leq 2 \leq m \leq n$, and both m and n are integers.

6. The antenna of claim 5, further comprising a connector electrically connected to the first feed line at the first stage through the first feed port.

7. The antenna of claim 1, wherein each of the at least one first radiation portion and each of the at least one second radiation portion comprise a polygon, and any interior angle of the polygon is greater than or equal to 90°.

8. The antenna of claim 7, wherein the polygon comprises a first side, a second side, a third side, a fourth side, a fifth side and a sixth side which are connected in sequence; an extending direction of the first side is the same as that of the fourth side, and is perpendicular to that of the second side and that of the fifth side; extending directions of the third side and the sixth side are the same, and an angle between each of the extending directions of the third side and the sixth side and the extending direction of the first side is in a range from 44.5° to 45.5°.

9. The antenna of claim 8, wherein the first side, the second side, the fourth side and the fifth side of the first radiation portion have a same length, which is between 0.240 and 0.242 times a wavelength corresponding to an operating frequency of the antenna; and the third side and the sixth side of the first radiation portion have a same length, which is between 0.073 and 0.074 times of the wavelength corresponding to the operating frequency of the antenna; and lengths of the first side, the second side, the fourth side and the fifth side of the second radiation portion are each between 0.272 and 0.274 times the wavelength corresponding to the operating frequency of the antenna; and lengths of the third side and the sixth side of the second radiation portion are each between 0.092 and 0.094 times the wavelength corresponding to the operating frequency of the antenna.

10. The antenna of claim 9, further comprising a plurality of first metal isolation pillars penetrating through the antenna substrate; wherein an outline of an orthographic projection of the plurality of first metal isolation pillars on the first dielectric substrate surrounds a corresponding first radiation portion.

11. The antenna of claim 8, further comprising a plurality of first metal isolation pillars penetrating through the antenna substrate; wherein an outline of an orthographic projection of the plurality of first metal isolation pillars on the first dielectric substrate surrounds a corresponding first radiation portion.

12. The antenna of claim 1, further comprising a plurality of first metal isolation pillars penetrating through the antenna substrate; wherein an outline of an orthographic projection of the plurality of first metal isolation pillars on the first dielectric substrate surrounds a corresponding first radiation portion.

13. The antenna of claim 12, wherein a ratio of a radius of a first metal isolation pillar of the plurality of first metal isolation pillars to a distance between any two adjacent first metal isolation pillars of the plurality of first metal isolation pillars is between 0.25 and 0.5.

14. The antenna of claim 1, further comprising a plurality of second metal isolation pillars penetrating through the antenna substrate; wherein an outline of an orthographic projection of the plurality of second metal isolation pillars on the first dielectric substrate surrounds a corresponding phase shifter.

15. The antenna of claim 14, wherein a ratio of a radius of a second metal isolation pillar of the plurality of second metal isolation pillars to a distance between any two adjacent second metal isolation pillars of the plurality of second metal isolation pillars is between 0.25 and 0.5.

16. The antenna of claim 1, wherein a thickness of the tunable dielectric layer is between 4.4 μm and 4.8 μm.

17. The antenna of claim 1, wherein the antenna substrate further comprises at least two second feed lines on a side of the first dielectric substrate away from the reference electrode layer; the at least two second feed lines are respectively at positions of the feed structure away from a center of the antenna substrate;

the first substrate further comprises third transmission lines on a side of the second dielectric substrate close to the tunable dielectric layer; each of the at least two second feed lines is electrically connected to a corresponding third transmission line through a corresponding first opening;

the antenna substrate further comprises at least two dummy units; each of which comprises a third radiation portion on a side of the first dielectric substrate away from the reference electrode layer; each of the third transmission lines is electrically connected to the third radiation portion of a corresponding dummy unit through a corresponding second opening; and each of the at least two dummy unit further comprises a fourth radiation portion on a side of the fourth dielectric substrate away from the first dielectric substrate; and orthographic projections of the third radiation portion and the fourth radiation portion corresponding to each other on the first dielectric substrate overlap with each other.

18. The antenna of claim 1, further comprising a second adhesive layer between the reference electrode layer and the first substrate, wherein the second adhesive layer is configured to attach the reference electrode layer to the first substrate.

19. An electronic device, comprising the antenna of claim 1, and a control unit;

wherein the control unit is configured to load a bias voltage to the at least one phase shifter in the antenna.

* * * * *